(12) United States Patent
Williams et al.

(10) Patent No.: US 12,441,553 B2
(45) Date of Patent: Oct. 14, 2025

(54) BUFFERING SYSTEMS AND METHODS FOR DYNAMIC PROCESSING OF OBJECTS

(71) Applicant: Berkshire Grey Operating Company, Inc., Bedford, MA (US)

(72) Inventors: Robert Williams, Natick, MA (US); Anthony Paul, Boston, MA (US); Nector Ritzakis, Lexington, MA (US)

(73) Assignee: Berkshire Grey Operating Company, Inc., Bedford, MA (US)

( * ) Notice: Subject to any disclaimer, the term of this patent is extended or adjusted under 35 U.S.C. 154(b) by 104 days.

(21) Appl. No.: 18/125,478

(22) Filed: Mar. 23, 2023

(65) Prior Publication Data

US 2023/0303338 A1    Sep. 28, 2023

Related U.S. Application Data

(60) Provisional application No. 63/322,798, filed on Mar. 23, 2022.

(51) Int. Cl.
*B65G 47/64* (2006.01)
*B65G 13/02* (2006.01)

(52) U.S. Cl.
CPC .......... *B65G 47/643* (2013.01); *B65G 13/02* (2013.01)

(58) Field of Classification Search
CPC .... B65G 47/643; B65G 13/02; B65G 11/203; B65G 2203/0208; B65G 2203/041; B65G 43/08; B65G 21/14
See application file for complete search history.

(56) References Cited

U.S. PATENT DOCUMENTS

| | | | |
|---|---|---|---|
| 3,592,326 A | 7/1971 | Zimmerle et al. | |
| 3,595,407 A | 7/1971 | Muller-Kuhn et al. | |
| 3,734,286 A | 5/1973 | Simjian | |
| 3,983,988 A | 10/1976 | Maxted et al. | |
| 4,067,456 A | 1/1978 | Schmitt | |
| 4,073,375 A | 2/1978 | Hart et al. | |
| 4,136,780 A | 1/1979 | Hunter et al. | |
| 4,186,836 A | 2/1980 | Wassmer et al. | |

(Continued)

FOREIGN PATENT DOCUMENTS

| | | |
|---|---|---|
| AU | 2006204622 A1 | 3/2007 |
| CA | 3060257 C | 3/2023 |

(Continued)

OTHER PUBLICATIONS

IPSearch History May 28, 2025 UTC; InnovationQ+; https://iq.ip.com/discover (Year: 2025).*

(Continued)

*Primary Examiner* — Gene O Crawford
*Assistant Examiner* — Abby A Jorgensen
(74) *Attorney, Agent, or Firm* — Gesmer Updegrove LLP

(57) ABSTRACT

A buffering system is disclosed for use between an upper processing area and a lower processing area. The buffering system includes a belt and at least one roller around at least a portion of which the belt extends. The belt is anchored at a first anchor location to a frame. The buffering system also includes an actuation system for moving the at least one roller with respect to the first anchor location to cause the belt to move such that a portion of the buffering system becomes open thereby providing a retractable belt door.

81 Claims, 26 Drawing Sheets

(56) References Cited

U.S. PATENT DOCUMENTS

| | | |
|---|---|---|
| 4,360,098 A | 11/1982 | Nordstrom |
| 4,560,060 A | 12/1985 | Lenhart |
| 4,622,875 A | 11/1986 | Emery et al. |
| 4,722,653 A | 2/1988 | Williams et al. |
| 4,759,439 A | 7/1988 | Hartlepp |
| 4,819,784 A | 4/1989 | Sticht |
| 4,846,335 A | 7/1989 | Hartlepp |
| 4,895,242 A | 1/1990 | Michel |
| 5,082,103 A | 1/1992 | Ross et al. |
| 5,097,939 A | 3/1992 | Shanklin et al. |
| 5,119,306 A | 6/1992 | Metelits et al. |
| 5,145,049 A | 9/1992 | McClurkin |
| 5,190,162 A | 3/1993 | Hartlepp |
| 5,326,219 A | 7/1994 | Pippin et al. |
| 5,419,457 A | 5/1995 | Ross et al. |
| 5,460,271 A | 10/1995 | Kenny et al. |
| 5,585,917 A | 12/1996 | Woite et al. |
| 5,672,039 A | 9/1997 | Perry et al. |
| 5,713,473 A | 2/1998 | Satake et al. |
| 5,794,788 A | 8/1998 | Massen |
| 5,794,789 A | 8/1998 | Payson et al. |
| 5,806,661 A | 9/1998 | Martin et al. |
| 5,839,566 A | 11/1998 | Bonnet |
| 5,875,434 A | 2/1999 | Matsuoka et al. |
| 5,990,437 A | 11/1999 | Coutant et al. |
| 6,060,677 A | 5/2000 | Ulrichsen et al. |
| 6,124,560 A | 9/2000 | Roos et al. |
| 6,246,023 B1 | 6/2001 | Kugle |
| 6,311,892 B1 | 11/2001 | O'Callaghan et al. |
| 6,323,452 B1 | 11/2001 | Bonnet |
| 6,401,936 B1 | 6/2002 | Isaacs et al. |
| 6,499,604 B1 | 12/2002 | Kitson |
| 6,688,459 B1 | 2/2004 | Bonham et al. |
| 6,762,382 B1 | 7/2004 | Danelski |
| 6,897,395 B2 | 5/2005 | Shiibashi et al. |
| 7,306,086 B2 | 12/2007 | Boelaars |
| 8,560,406 B1 | 10/2013 | Antony |
| 8,731,711 B1 | 5/2014 | Joplin et al. |
| 8,776,694 B2 | 7/2014 | Rosenwinkel et al. |
| 8,851,275 B2 * | 10/2014 | Tsai .................. B65H 31/3009 |
| | | 198/594 |
| 8,997,438 B1 | 4/2015 | Fallas |
| 9,020,632 B2 | 4/2015 | Naylor |
| 9,102,336 B2 | 8/2015 | Rosenwinkel |
| 9,174,758 B1 | 11/2015 | Rowley et al. |
| 9,364,865 B2 | 6/2016 | Kim |
| 9,517,492 B2 | 12/2016 | Schwarzbauer et al. |
| 9,604,258 B2 * | 3/2017 | Layne .................... B65G 21/14 |
| 9,650,214 B2 | 5/2017 | Hoganson |
| 9,751,693 B1 | 9/2017 | Battles et al. |
| 9,878,349 B2 | 1/2018 | Crest et al. |
| 9,926,138 B1 | 3/2018 | Brazeau et al. |
| 9,931,673 B2 | 4/2018 | Nice et al. |
| 9,937,532 B2 | 4/2018 | Wagner et al. |
| 9,962,743 B2 | 5/2018 | Bombaugh et al. |
| 9,975,148 B2 | 5/2018 | Zhu et al. |
| 10,029,865 B1 | 7/2018 | McCalib, Jr. et al. |
| 10,198,710 B1 | 2/2019 | Hahn et al. |
| 10,206,519 B1 | 2/2019 | Gyori et al. |
| 10,438,034 B2 | 10/2019 | Wagner et al. |
| 10,538,394 B2 | 1/2020 | Wagner et al. |
| 10,576,621 B2 | 3/2020 | Wagner et al. |
| 10,577,180 B1 | 3/2020 | Mehta et al. |
| 10,611,021 B2 | 4/2020 | Wagner et al. |
| 10,639,678 B2 | 5/2020 | Cherry et al. |
| 10,809,122 B1 | 10/2020 | Danenberg et al. |
| 10,810,715 B2 | 10/2020 | Chamberlin |
| 10,853,757 B1 | 12/2020 | Hill et al. |
| 11,055,504 B2 | 7/2021 | Wagner et al. |
| 11,080,496 B2 | 8/2021 | Wagner et al. |
| 11,126,807 B2 | 9/2021 | Wagner et al. |
| 11,200,390 B2 | 12/2021 | Wagner et al. |
| 11,205,059 B2 | 12/2021 | Wagner et al. |
| 11,416,695 B2 | 8/2022 | Wagner et al. |
| 11,481,566 B2 | 10/2022 | Wagner et al. |
| 11,537,807 B2 | 12/2022 | Wagner et al. |
| 11,681,884 B2 | 6/2023 | Wagner et al. |
| 11,734,526 B2 | 8/2023 | Wagner et al. |
| 11,842,248 B2 | 12/2023 | Wagner et al. |
| 11,847,513 B2 | 12/2023 | Wagner et al. |
| 11,868,840 B2 | 1/2024 | Wagner et al. |
| 2002/0092801 A1 | 7/2002 | Dominguez |
| 2002/0134056 A1 | 9/2002 | Dimario et al. |
| 2002/0157919 A1 | 10/2002 | Sherwin |
| 2002/0170850 A1 | 11/2002 | Bonham et al. |
| 2002/0179502 A1 | 12/2002 | Cerutti et al. |
| 2003/0034281 A1 | 2/2003 | Kumar |
| 2003/0038065 A1 | 2/2003 | Pippin et al. |
| 2003/0075051 A1 | 4/2003 | Watanabe et al. |
| 2004/0065597 A1 | 4/2004 | Hanson |
| 2004/0118907 A1 | 6/2004 | Rosenbaum et al. |
| 2004/0194428 A1 | 10/2004 | Close et al. |
| 2004/0195320 A1 | 10/2004 | Ramsager |
| 2004/0215480 A1 | 10/2004 | Kadaba |
| 2004/0261366 A1 | 12/2004 | Gillet et al. |
| 2005/0002772 A1 | 1/2005 | Stone |
| 2005/0149226 A1 | 7/2005 | Stevens et al. |
| 2005/0220600 A1 | 10/2005 | Baker et al. |
| 2006/0021858 A1 | 2/2006 | Sherwood |
| 2006/0070929 A1 | 4/2006 | Fry et al. |
| 2007/0209976 A1 | 9/2007 | Worth et al. |
| 2008/0046116 A1 | 2/2008 | Khan et al. |
| 2008/0060916 A1 * | 3/2008 | Whittlesey .............. B65G 21/06 |
| | | 198/812 |
| 2008/0181753 A1 | 7/2008 | Bastian et al. |
| 2008/0193272 A1 | 8/2008 | Beller |
| 2009/0026017 A1 | 1/2009 | Freudelsperger |
| 2010/0122942 A1 | 5/2010 | Harres et al. |
| 2010/0318216 A1 | 12/2010 | Faivre et al. |
| 2011/0005894 A1 | 1/2011 | Tsai |
| 2011/0084003 A1 | 4/2011 | Benjamins |
| 2011/0130868 A1 | 6/2011 | Baumann |
| 2011/0144798 A1 | 6/2011 | Freudelsperger |
| 2011/0238207 A1 | 9/2011 | Bastian, II et al. |
| 2011/0243707 A1 | 10/2011 | Dumas et al. |
| 2011/0320036 A1 | 12/2011 | Freudelsperger |
| 2012/0096818 A1 | 4/2012 | Pippin |
| 2012/0118699 A1 | 5/2012 | Buchman et al. |
| 2012/0125735 A1 | 5/2012 | Schuitema et al. |
| 2012/0293623 A1 | 11/2012 | Nygaard |
| 2013/0001139 A1 | 1/2013 | Tanner |
| 2013/0051696 A1 | 2/2013 | Garrett et al. |
| 2013/0104664 A1 | 5/2013 | Chevalier, Jr. et al. |
| 2013/0110280 A1 | 5/2013 | Folk |
| 2013/0202195 A1 | 8/2013 | Perez Cortes et al. |
| 2014/0244026 A1 | 8/2014 | Neiser |
| 2014/0249666 A1 | 9/2014 | Radwallner et al. |
| 2014/0277693 A1 | 9/2014 | Naylor |
| 2014/0291112 A1 | 10/2014 | Lyon et al. |
| 2015/0068866 A1 | 3/2015 | Fourney |
| 2015/0098775 A1 | 4/2015 | Razumov |
| 2015/0114799 A1 | 4/2015 | Hansl et al. |
| 2016/0042320 A1 | 2/2016 | Dearing et al. |
| 2016/0083196 A1 | 3/2016 | Dugat |
| 2016/0221762 A1 | 8/2016 | Schroader |
| 2016/0221766 A1 | 8/2016 | Schroader et al. |
| 2016/0228921 A1 | 8/2016 | Doublet et al. |
| 2017/0057756 A1 | 3/2017 | Dugat et al. |
| 2017/0108577 A1 | 4/2017 | Loverich et al. |
| 2017/0121113 A1 | 5/2017 | Wagner et al. |
| 2017/0129707 A1 * | 5/2017 | Nakamoto ........... B65G 47/912 |
| 2017/0157649 A1 | 6/2017 | Wagner et al. |
| 2017/0197233 A1 | 7/2017 | Bombaugh et al. |
| 2017/0225330 A1 | 8/2017 | Wagner et al. |
| 2017/0243158 A1 | 8/2017 | Gupta et al. |
| 2017/0312789 A1 | 11/2017 | Schroader |
| 2017/0330135 A1 | 11/2017 | Taylor et al. |
| 2017/0349385 A1 | 12/2017 | Moroni et al. |
| 2017/0369244 A1 | 12/2017 | Battles et al. |
| 2018/0001353 A1 | 1/2018 | Stockard et al. |
| 2018/0044120 A1 | 2/2018 | Mäder |
| 2018/0065156 A1 | 3/2018 | Winkle et al. |
| 2018/0068266 A1 | 3/2018 | Kirmani et al. |
| 2018/0085788 A1 | 3/2018 | Engel et al. |

(56) References Cited

U.S. PATENT DOCUMENTS

| | | | |
|---|---|---|---|
| 2018/0105363 A1 | 4/2018 | Lisso et al. | |
| 2018/0127219 A1 | 5/2018 | Wagner et al. | |
| 2018/0186572 A1 | 7/2018 | Issing | |
| 2018/0224837 A1 | 8/2018 | Enssle | |
| 2018/0265291 A1 | 9/2018 | Wagner et al. | |
| 2018/0265298 A1 | 9/2018 | Wagner et al. | |
| 2018/0265311 A1 | 9/2018 | Wagner et al. | |
| 2018/0273295 A1 | 9/2018 | Wagner et al. | |
| 2018/0273296 A1 | 9/2018 | Wagner et al. | |
| 2018/0273297 A1 | 9/2018 | Wagner et al. | |
| 2018/0273298 A1 | 9/2018 | Wagner et al. | |
| 2018/0282065 A1 | 10/2018 | Wagner et al. | |
| 2018/0282066 A1 | 10/2018 | Wagner et al. | |
| 2018/0312336 A1 | 11/2018 | Wagner et al. | |
| 2018/0327198 A1 | 11/2018 | Wagner et al. | |
| 2018/0330134 A1 | 11/2018 | Wagner et al. | |
| 2019/0022702 A1 | 1/2019 | Vegh et al. | |
| 2019/0030712 A1 | 1/2019 | Sciog et al. | |
| 2019/0091730 A1 | 3/2019 | Torang | |
| 2019/0337723 A1 | 11/2019 | Wagner et al. | |
| 2020/0005005 A1 | 1/2020 | Wagner et al. | |
| 2020/0023410 A1 | 1/2020 | Tamura et al. | |
| 2020/0126025 A1 | 4/2020 | Kumar et al. | |
| 2020/0143127 A1 | 5/2020 | Wagner et al. | |
| 2020/0151407 A1 | 5/2020 | Wagner et al. | |
| 2020/0151408 A1 | 5/2020 | Wagner et al. | |
| 2020/0151409 A1 | 5/2020 | Wagner et al. | |
| 2020/0151410 A1 | 5/2020 | Wagner et al. | |
| 2020/0160011 A1 | 5/2020 | Wagner et al. | |
| 2020/0265201 A1 | 8/2020 | Wagner et al. | |
| 2020/0319627 A1 | 10/2020 | Edwards et al. | |
| 2020/0363259 A1 | 11/2020 | Bergstra et al. | |
| 2021/0122589 A1 | 4/2021 | Griggs | |
| 2021/0214163 A1 | 7/2021 | Deacon et al. | |
| 2021/0271835 A1 | 9/2021 | Wagner et al. | |
| 2021/0312149 A1 | 10/2021 | Wagner et al. | |
| 2021/0374367 A1 | 12/2021 | Wagner et al. | |
| 2022/0043991 A1 | 2/2022 | Wagner et al. | |
| 2022/0058354 A1 | 2/2022 | Wagner et al. | |
| 2022/0134543 A1 | 5/2022 | Amend, Jr. et al. | |
| 2022/0135329 A1 | 5/2022 | Cohen et al. | |
| 2022/0198164 A1 | 6/2022 | Wagner et al. | |
| 2022/0261738 A1 | 8/2022 | Kumar et al. | |
| 2022/0276088 A1 | 9/2022 | Bergstra et al. | |
| 2022/0277155 A1 | 9/2022 | Wagner et al. | |
| 2022/0314440 A1 | 10/2022 | Mizoguchi et al. | |
| 2023/0062501 A1 | 3/2023 | Wagner et al. | |
| 2023/0077893 A1 | 3/2023 | Gebhardt et al. | |
| 2023/0219767 A1 | 7/2023 | Demir et al. | |
| 2023/0334275 A1 | 10/2023 | Wagner et al. | |
| 2023/0342573 A1 | 10/2023 | Wagner et al. | |
| 2023/0401398 A1 | 12/2023 | Wagner et al. | |
| 2024/0010445 A1 | 1/2024 | Saslaw et al. | |
| 2024/0037353 A1 | 2/2024 | Wagner et al. | |
| 2024/0054302 A1 | 2/2024 | Wagner et al. | |
| 2024/0054303 A1 | 2/2024 | Wagner et al. | |
| 2024/0330626 A1 | 10/2024 | Wagner et al. | |
| 2024/0412014 A1 | 12/2024 | Wagner et al. | |
| 2024/0428029 A1 | 12/2024 | Wagner et al. | |

FOREIGN PATENT DOCUMENTS

| | | | | |
|---|---|---|---|---|
| CA | 3126766 | C | 9/2023 | |
| CA | 3126138 | C | 2/2024 | |
| CA | 3126258 | C | 2/2024 | |
| CA | 3126276 | C | 5/2024 | |
| CN | 1033604 | A | 7/1989 | |
| CN | 1643731 | A | 7/2005 | |
| CN | 1671489 | A | 9/2005 | |
| CN | 1783112 | A | 6/2006 | |
| CN | 1809428 | A | 7/2006 | |
| CN | 102884539 | A | 1/2013 | |
| CN | 103129783 | A | 6/2013 | |
| CN | 103442998 | A | 12/2013 | |
| CN | 103842270 | A | 6/2014 | |
| CN | 104355032 | A | 2/2015 | |
| CN | 104507814 | A | 4/2015 | |
| CN | 104858150 | A | 8/2015 | |
| CN | 204837530 | U | 12/2015 | |
| CN | 105314417 | A | 2/2016 | |
| CN | 105383906 | A | 3/2016 | |
| CN | 105668255 | A | 6/2016 | |
| CN | 105761195 | A | 7/2016 | |
| CN | 105800323 | A | 7/2016 | |
| CN | 105855189 | A | 8/2016 | |
| CN | 105873838 | A | 8/2016 | |
| CN | 205500186 | U | 8/2016 | |
| CN | 106111551 | A | 11/2016 | |
| CN | 106169168 | A | 11/2016 | |
| CN | 106734076 | A | 5/2017 | |
| CN | 107430719 | A | 12/2017 | |
| CN | 107472815 | A | 12/2017 | |
| CN | 108136596 | A | 6/2018 | |
| CN | 108137232 | A | 6/2018 | |
| CN | 108290297 | A | 7/2018 | |
| CN | 108290685 | A | 7/2018 | |
| CN | 108351637 | A | 7/2018 | |
| CN | 108602630 | A | 9/2018 | |
| CN | 108604091 | A | 9/2018 | |
| CN | 207981651 | U | 10/2018 | |
| CN | 108778636 | A | 11/2018 | |
| CN | 108921241 | A | 11/2018 | |
| CN | 109181473 | A | 1/2019 | |
| CN | 208304180 | U | 1/2019 | |
| CN | 110740954 | A | 1/2020 | |
| CN | 113039549 | A | 6/2021 | |
| CN | 113272835 | A | 8/2021 | |
| CN | 113272836 | A | 8/2021 | |
| CN | 113272837 | A | 8/2021 | |
| CN | 113287128 | A | 8/2021 | |
| CN | 113287129 | A | 8/2021 | |
| CN | 113287130 | A | 8/2021 | |
| CN | 113955367 | A | 1/2022 | |
| CN | 118798761 | A | 10/2024 | |
| CN | 119486822 | A | 2/2025 | |
| DE | 19510392 | A1 | 9/1996 | |
| DE | 102004001181 | A1 | 8/2005 | |
| DE | 102007023909 | A1 | 11/2008 | |
| DE | 102007038834 | A1 | 2/2009 | |
| DE | 102008039764 | A1 | 5/2010 | |
| EP | 124177 | A * | 11/1984 | ............. B65G 15/22 |
| EP | 0124177 | A1 | 11/1984 | |
| EP | 0235488 | A1 | 9/1987 | |
| EP | 0613841 | A1 | 9/1994 | |
| EP | 0648695 | A2 | 4/1995 | |
| EP | 1695927 | A2 | 8/2006 | |
| EP | 1995192 | A2 | 11/2008 | |
| EP | 2233400 | A1 | 9/2010 | |
| EP | 2477914 | B1 | 4/2013 | |
| EP | 2995567 | A1 | 3/2016 | |
| EP | 3112295 | A1 | 1/2017 | |
| FR | 2832654 | A1 | 5/2003 | |
| GB | 2084531 | A | 4/1982 | |
| JP | H0985181 | A | 3/1997 | |
| JP | 2002028577 | A | 1/2002 | |
| JP | 2007182286 | A | 7/2007 | |
| JP | 2008037567 | A | 2/2008 | |
| JP | 4150106 | B2 | 9/2008 | |
| JP | 2010202291 | A | 9/2010 | |
| WO | 9731843 | A1 | 9/1997 | |
| WO | 03095339 | A1 | 11/2003 | |
| WO | 2005118436 | A1 | 12/2005 | |
| WO | 2007009136 | A1 | 1/2007 | |
| WO | 2008091733 | A2 | 7/2008 | |
| WO | 2010017872 | A1 | 2/2010 | |
| WO | WO-2011021056 | A1 * | 2/2011 | ............... B07C 5/36 |
| WO | 2011038442 | A2 | 4/2011 | |
| WO | 2015118171 | A1 | 8/2015 | |
| WO | 2016012742 | A1 | 1/2016 | |
| WO | 2017036780 | A1 | 3/2017 | |
| WO | 2017044747 | A1 | 3/2017 | |
| WO | 2017096021 | A1 | 6/2017 | |
| WO | 2017192783 | A1 | 11/2017 | |
| WO | 2018175717 | A1 | 3/2018 | |

(56) References Cited

FOREIGN PATENT DOCUMENTS

| WO | 2018175466 | A1 | | 9/2018 | | |
|----|------------|----|---|--------|---|---|
| WO | 2018176033 | A1 | | 9/2018 | | |
| WO | 2018190238 | A1 | | 10/2018 | | |
| WO | 2018195196 | A1 | | 10/2018 | | |
| WO | 2020086748 | A1 | | 4/2020 | | |
| WO | 2020146467 | A1 | | 7/2020 | | |
| WO | 2020146472 | A1 | | 7/2020 | | |
| WO | 2020146480 | A1 | | 7/2020 | | |
| WO | 2020146487 | A1 | | 7/2020 | | |
| WO | 2020146503 | A1 | | 7/2020 | | |
| WO | 2020146509 | A1 | | 7/2020 | | |
| WO | WO-2021252073 | A1 | * | 12/2021 | ............... | B07C 5/36 |
| WO | 2024010796 | A2 | | 1/2024 | | |

OTHER PUBLICATIONS

International Preliminary Report on Patentability issued by the International Bureau of WIPO in related International Application No. PCT/US2023/016087 on Sep. 24, 2024, 9 pages.

Notification of Transmittal of the International Search Report and The Written Opinion of the International Searching Authority (the European Patent Office) and the International Search Report and Written Opinion of the International Searching Authority issued in related International Application No. PCT/US2023/016087 on Sep. 13, 2023, 15 pages.

Chao et al., Design and test of vacuum suction device for egg embryo activity sorting robot, Transactions of the Chinese Society of Agricultural Engineering, vol. 16, pp. 276-283, Aug. 23, 2017.

International Preliminary Report on Patentability issued by the International Bureau of WIPO on Oct. 22, 2019, in related International Application No. PCT/US2018/028164, 11 pages.

International Preliminary Report on Patentability issued by the International Bureau of WIPO in related International Application No. PCT/US2019/057710 on Apr. 27, 2021, 8 pages.

International Preliminary Report on Patentability issued by the International Bureau of WIPO in related International Application No. PCT/US2020/012744 on Jun. 16, 2021, 8 pages.

International Preliminary Report on Patentability issued by the International Bureau of WIPO in related International Application No. PCT/US2020/012720 on Jun. 16, 2021, 8 pages.

International Preliminary Report on Patentability issued by the International Bureau of WIPO in related International Application No. PCT/US2020/012695 on Jun. 16, 2021, 8 pages.

International Preliminary Report on Patentability issued by the International Bureau of WIPO in related International Application No. PCT/US2020/012713 on Jun. 16, 2021, 8 pages.

International Preliminary Report on Patentability issued by the International Bureau of WIPO in related International Application No. PCT/US2020/012754 on Jun. 16, 2021, 8 pages.

International Preliminary Report on Patentability issued by the International Bureau of WIPO in related International Application No. PCT/US2020/012704 on Jun. 16, 2021, 9 pages.

International Preliminary Report on Patentability issued by the International Bureau of WIPO in related international application No. PCT/US2023/026911 on Dec. 18, 2024, 12 pages.

International Search Report and Written Opinion issued by the International Searching Authority on Aug. 9, 2018, in related International Application No. PCT/US2018/028164, 16 pages.

International Search Report and Written Opinion issued by the International Searching Authority on Mar. 25, 2020, in related International Application No. PCT/US2020/012695, 13 pages.

International Search Report and Written Opinion issued by the International Searching Authority on Mar. 25, 2020, in related International Application No. PCT/US2020/012704, 14 pages.

International Search Report and Written Opinion issued by the International Searching Authority on Mar. 25, 2020, in related International Application No. PCT/US2020/012713, 13 pages.

International Search Report and Written Opinion issued by the International Searching Authority on Mar. 25, 2020, in related International Application No. PCT/US2020/012720, 13 pages.

International Search Report and Written Opinion issued by the International Searching Authority on Mar. 25, 2020, in related International Application No. PCT/US2020/012744, 13 pages.

International Search Report and Written Opinion issued by the International Searching Authority on Mar. 25, 2020, in related International Application No. PCT/US2020/012754, 13 pages.

International Search Report and Written Opinion issued by the International Searching Authority on Feb. 6, 2020 in related International Application No. PCT/US2019/057710, 12 pages.

International Search Report and the Written Opinion of the International Searching Authority (the European Patent Office) issued in related International Application No. PCT/US2023/026911 on Jan. 8, 2024, 20 pages.

* cited by examiner

BUFFERING SYSTEMS AND METHODS FOR DYNAMIC PROCESSING OF OBJECTS

PRIORITY

The present application claims priority to U.S. Provisional Patent Application No. 63/322,798 filed Mar. 23, 2022, the disclosure of which is hereby incorporated by reference in its entirety.

BACKGROUND

The invention generally relates to object processing systems and relates in particular to object processing systems that determine metrics regarding objects or otherwise individually handle objects being processed (e.g., distributed or sorted) while the objects are being processed.

Current object processing systems generally involve the processing of a large number of objects, where the objects are received in either organized or disorganized batches, and must be routed to desired destinations in accordance with a manifest or specific addresses on the objects (e.g., in a mailing system).

Current distribution center sorting systems, for example, generally assume an inflexible sequence of operations whereby a disorganized stream of input objects is first singulated into a stream of isolated objects presented one at a time to a scanner that identifies the object. An induction element (e.g., a conveyor, a tilt tray, or manually movable bins) transport the objects to the desired destination or further processing station, which may be a bin, a chute, a bag or a conveyor, etc.

In typical parcel sortation systems, human workers or automated systems typically retrieve parcels in an arrival order and sort each parcel or object into a collection bin based on a set of given heuristics. For instance, all objects of like type might go to a collection bin, or all objects in a single customer order, or all objects destined for the same shipping destination, etc. The human workers or automated systems are required to receive objects and to move each to their assigned collection bin. If the number of different types of input (received) objects is large, a large number of collection bins is required.

Current state-of-the-art sortation systems rely on human labor to some extent. Most solutions rely on a worker that is performing sortation, by scanning an object from an induction area (chute, table, etc.) and placing the object in a staging location, conveyor, or collection bin. When a bin is full or the controlling software system determines that it needs to be emptied, another worker empties the bin into a bag, box, or other container, and sends that container on to the next processing step. Such a system has limits on throughput (i.e., how fast can human workers sort to or empty bins in this fashion) and on number of diverts (i.e., for a given bin size, only so many bins may be arranged to be within efficient reach of human workers).

Human personnel is also sometimes required where the information to be captured regarding an object is difficult to obtain by scanning or camera based systems, or is highly sensitive such as weights of very light objects. If a wide range of objects are being processed, for example, then such a weight detection system must be able to accommodate receipt of the wide range of objects.

There remains a need for more efficient and more cost effective object processing systems that process objects of a variety of sizes and weights, and that determine these metrics regarding objects being processed while the objects are being processed by automated object processing systems.

SUMMARY

In accordance with an aspect, the invention provides a buffering system for use between an upper processing area and a lower processing area. The buffering system includes a belt and at least one roller around at least a portion of which the belt extends, wherein the belt is anchored at a first anchor location to a frame, and actuation system for moving the at least one roller with respect to the first anchor location to cause the belt to move such that a portion of the buffering system becomes open thereby providing a retractable belt door.

In accordance with another aspect, the invention provides a buffering system for use between an upper processing area and a lower processing area. The buffering system includes at least one roller mounted for reciprocal movement with respect to a frame, and a belt extending around the at least one roller, and an actuation system for moving the at least one roller with respect to frame to cause the belt to move such that a portion of the buffering system becomes open thereby providing a retractable belt door.

In accordance with a further aspect, the invention provides a method of buffering an object falling from an upper processing area to a lower processing area. The method includes providing at least one retractable belt door onto which the object may fall, the retractable belt door including a belt, retracting the belt by moving one end only of the belt to peel away from the object, and permitting the object to fall through the retractable belt door.

BRIEF DESCRIPTION OF THE DRAWINGS

The following description may be further understood with reference to the accompanying drawings in which.

Figure 1:
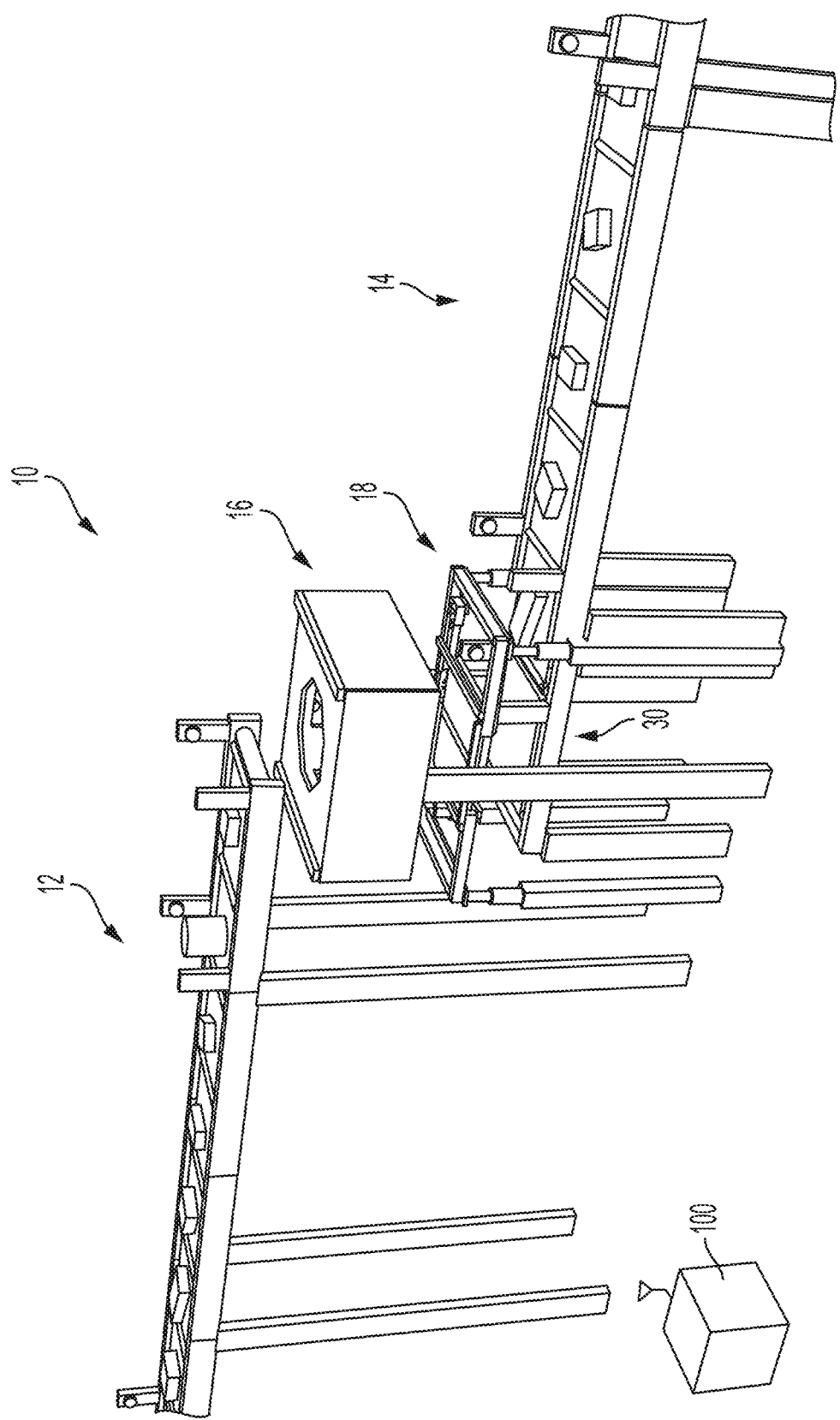
FIG. 1 shows an illustrative diagrammatic view of an object processing system including a buffering system in accordance with an aspect of the present invention.

The drawings are shown for illustrative purposes only.

DETAILED DESCRIPTION

Automated weighing systems may either capture a weight of an object while the object is stationary requiring that the object stop moving (including traveling and settling), or may seek to capture weight of an object while the object is moving requiring a generally larger footprint of processing equipment. The larger footprint of processing equipment may be required, for example, if a weighing-while-moving conveyor operates at a speed different than that of a primary processing conveyor, requiring preceding and succeeding transition conveyors. In accordance with various aspects, systems of the invention provide that weight of objects may be captured using a smaller footprint assembly while maintaining higher processing speeds.

In accordance with various aspects, the invention provides for the use of sensitive and finely adjusted weight measuring systems in automated object processing systems. In many applications, the detection of weight of individual objects being processed is desired, but certain weight detection systems include sensitive instruments that are not sufficiently robust for use in an automated system that processes a wide variety of objects.

Commercial shipping entities rely on commercial weighing and measuring equipment that meet national and international standards, requiring that object weight metrics be very accurate. The National Conference on Weights and Measures (NCWM) and the Weights and Measure division of the National Institute for Standards and Technology (NIST) formed the National Type Evaluation Program (NTEP), which certifies Legal-for-Trade weighing equipment. The NTEP certification process is generally required for Legal-for-Trade weighing equipment.

In automated object processing systems, objects may be singulated (separated from other objects). The determination of certain metrics however, such as weight which requires contact with (e.g., support of) the object with no other objects or processing equipment on the measuring equipment, may be difficult in certain applications. For example, a Legal-for-Trade weighing system for an object may not include a weight of a conveyor belt and any other objects on the conveyor belt in the weight determination.

Further, certain automated object processing systems include stations that involve dropping an object from an upper processing station to a lower processing station, e.g., even passing through a drop scanning system as disclosed for example in U.S. Patent Application Publication No. 2017/017368, the disclosure of which is hereby incorporated by reference in its entirety, which discloses perception systems and methods for identifying objects using a drop perception system with an open top and an open bottom. While systems including stations that involve dropping an object from an upper processing station to a lower processing station may be used in connection with a singulation system that provides good object singularity, dropping objects directly onto a weighing system is problematic. Such weighing systems may include very sensitive weighing equipment that may be damaged by dropping objects onto the plate of a scale, particularly as the weights of different objects vary and further dropping an object from a height may produce a force on the scale of multiples of an object's weight upon impact.

Weighing systems that provide Legal-for-Trade measurements also need to be able to provide accurate measurements for very light objects. While some highly sensitive Legal-for-Trade weighing systems for light objects may include oscillators that permit the system to receive an impact and then settle (in reducing oscillations), this takes time, which in an automated system reduces throughput.

In accordance with various aspects, the invention involves providing a buffering system that is positioned between an upper processing area and a lower processing area. In certain aspects, the buffering system includes a low-profile buffer that is able to deposit an item onto a weighing conveyor. The buffering system temporarily catches a dropped parcel before depositing it onto a weighing conveyor. The buffering system is low profile so that it reduces any drop height, minimizes chances of jams, is able to absorb the shock of drops, has a fast deposition mechanism so as to maximize throughput, and does not impart any lateral motion to the object.

FIG. 1 shows a system 10 in accordance with an aspect of the invention that includes an upper processing area 12, a lower processing area 14, and an area intermediate the processing areas 12, 14 that includes a drop perception unit 16 and a buffering system 18. Objects drop from the upper processing area 12, through the drop perception unit 16, and onto the buffering system 18. Following release by the buffering system 18, each object is then placed onto a weighing system 30 by the buffering system 18, and the object is then moved through the lower processing area 14. As explained below in further detail, the buffering system includes one or two retractable belts (two are shown) that form buffering doors. Operation of the system is governed by one or more computer processing systems 100 that perform the functionality discussed herein in communication with the conveyors of the processing areas 12, 14, the perception units 13, 15, 90, 92, 94 (shown in FIG. 2C), the drop scanner 16, the buffering systems (e.g., 18) and the weighing systems (e.g., 30).

The system provides a retractable belt door onto which packages can be dropped from a relatively high height, but that has a low profile so that when it opens it can drop items from a much lower height onto a weighing conveyor in certain aspects. The system receives the object on a belt surface that is tensioned around two rollers that are in fixed positions relative to each other on a sliding frame. As the frame is moved out of the way of the object, the belt material peels away from underneath the object (so there is no shear). This allows the object to drop straight down onto the weighing system.

Figure 2A:
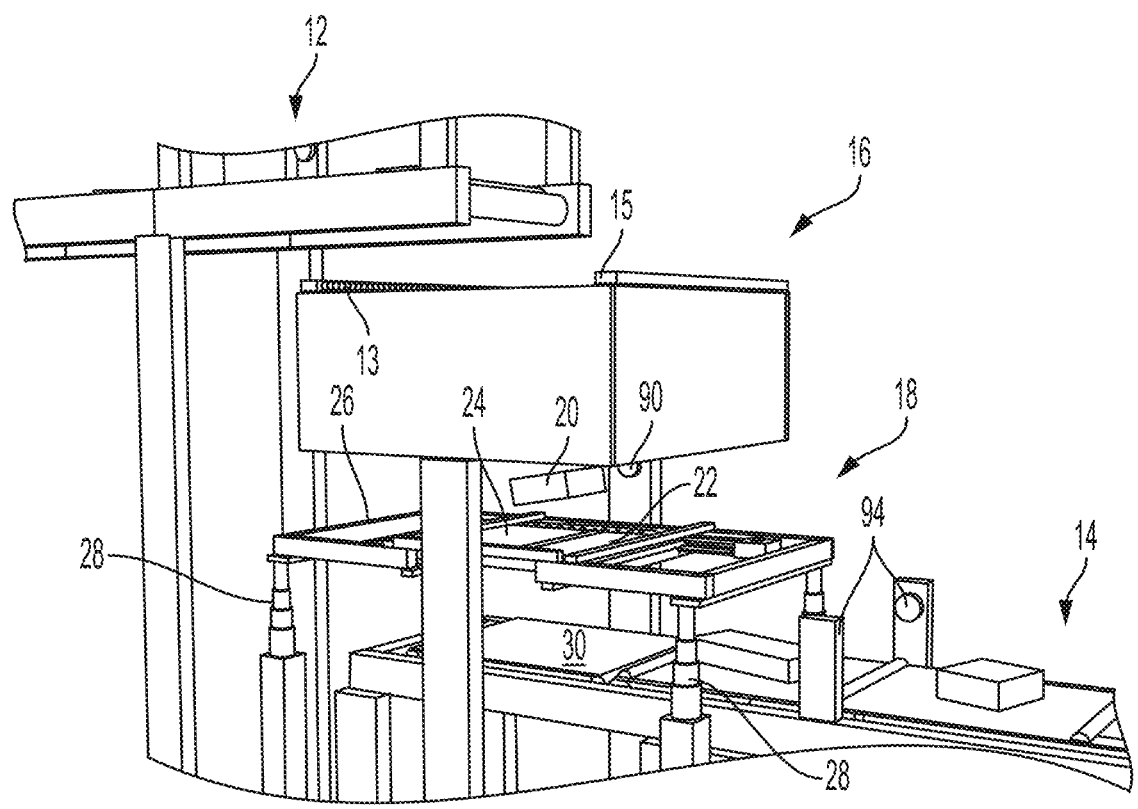
FIGS. 2A-2D show illustrative diagrammatic views of the buffering system of FIG. 1 showing an object falling to the buffering system (FIG. 2A), showing the object on the buffering system (FIG. 2B), showing the object falling from the buffering system (FIG. 2C), and showing the object falling onto a weighing system from the buffering system (FIG. 2D)
Figure 2B:
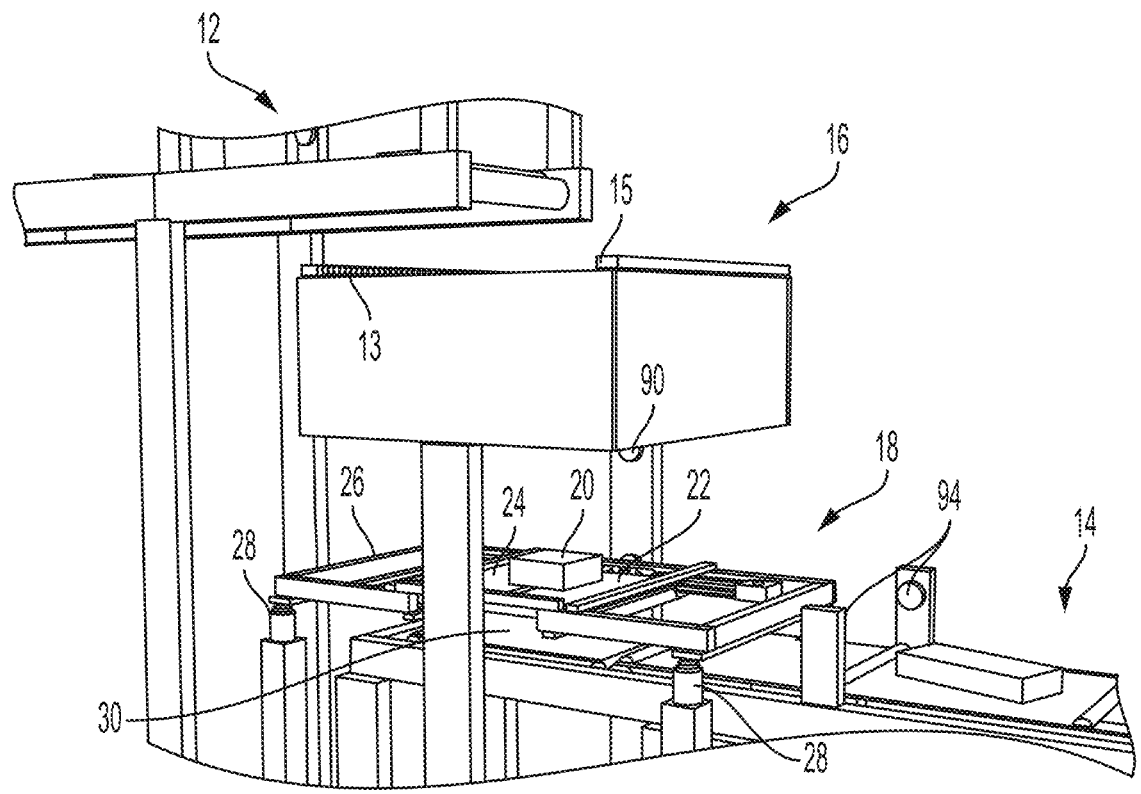
Figure 2C:
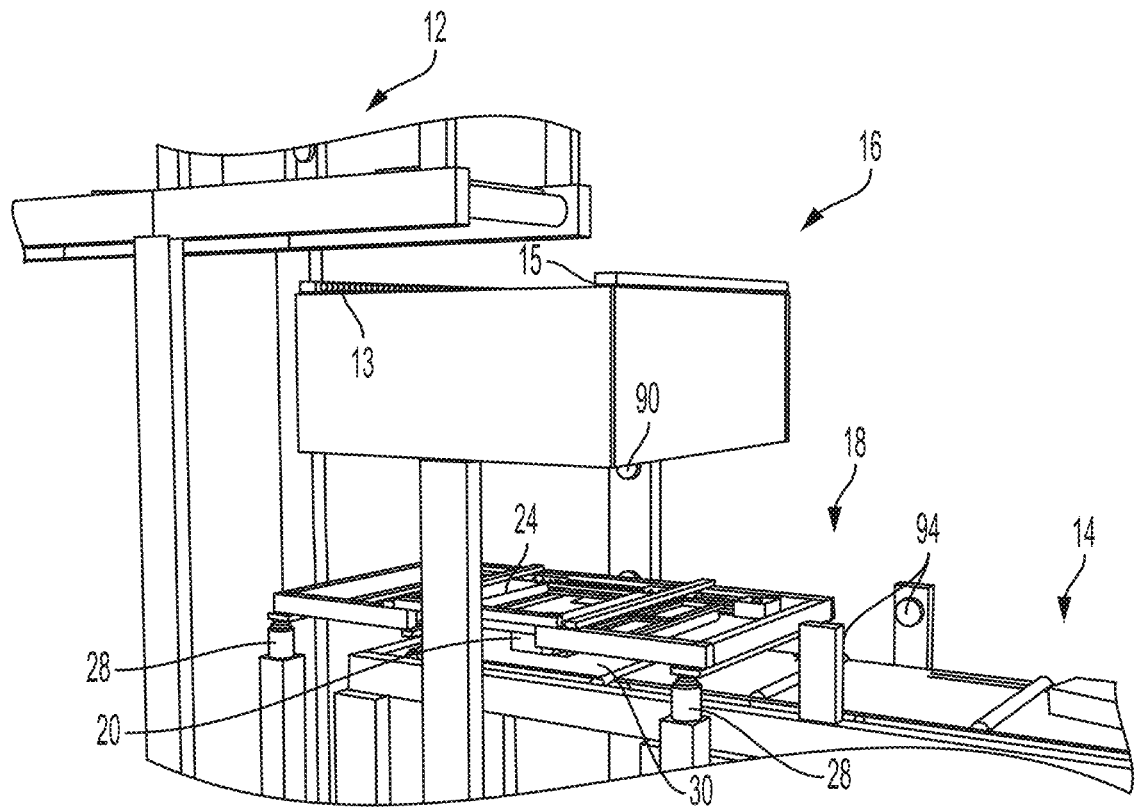
Figure 2D:
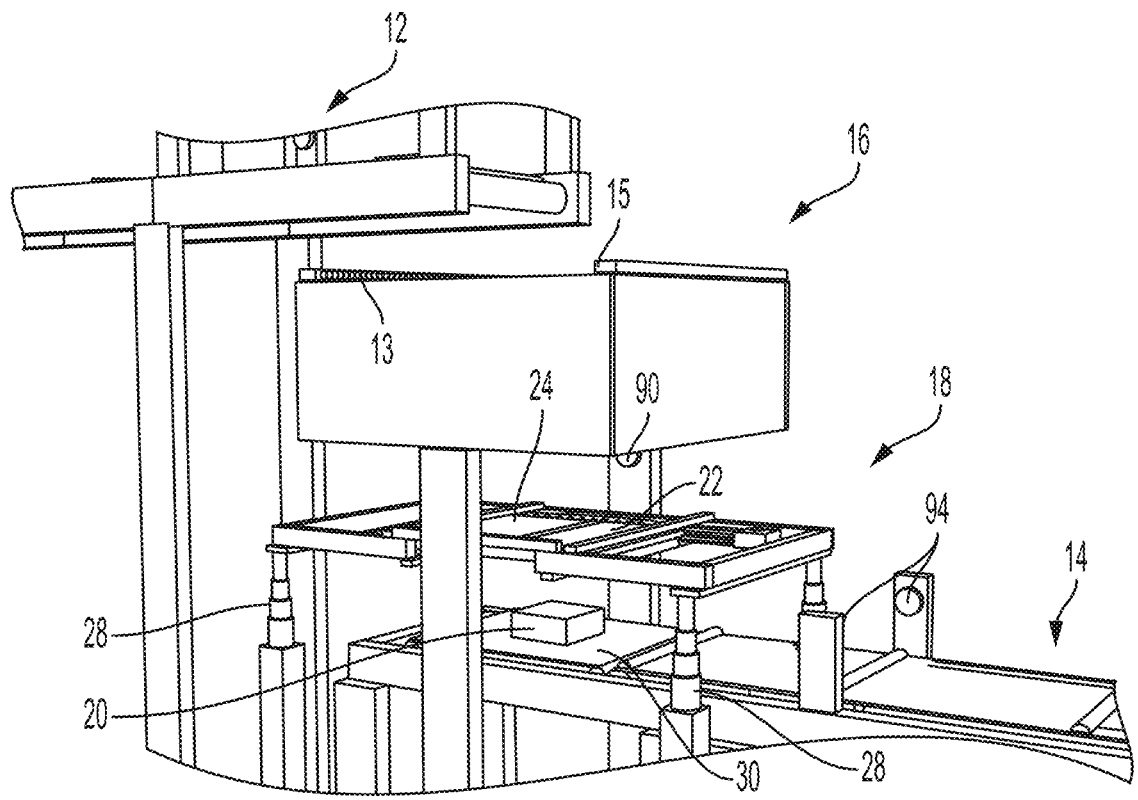

With reference to FIG. 2A, the object 20 falls from an upper processing area 12, through the drop perception system 16, and is received by one or two retractable belt doors 22, 24 mounted within a frame 26 on a plurality of supports 28. In accordance with various aspects, the supports 28 may optionally be vertically collapsible/extendable using support control systems. In particular, FIG. 2B shows the frame 26 with the retractable belt doors 22, 24 in a lowered position close to the weighing system 30 as lowered by the collapsible supports 28. As shown in FIG. 2C, the retractable belt doors 22, 24 are then opened, placing the object 20 gently onto the weighing system 30. With reference to FIG. 2D, the frame 26 (and retractable belt doors 22, 24) are then raised and closed to permit the object 20 to be moved along the lower processing area 14, and to be positioned to receive a new object. In accordance with other aspects the supports 28 may not be collapsible (or may not be collapsed), and the buffering system may drop objects from the raised position onto the weighing system without being lowered. Such a system may be used if the weighing system is known to be able to withstand some impact of objects, which are also known to have a weight below a maximum weight.

Figure 3A:
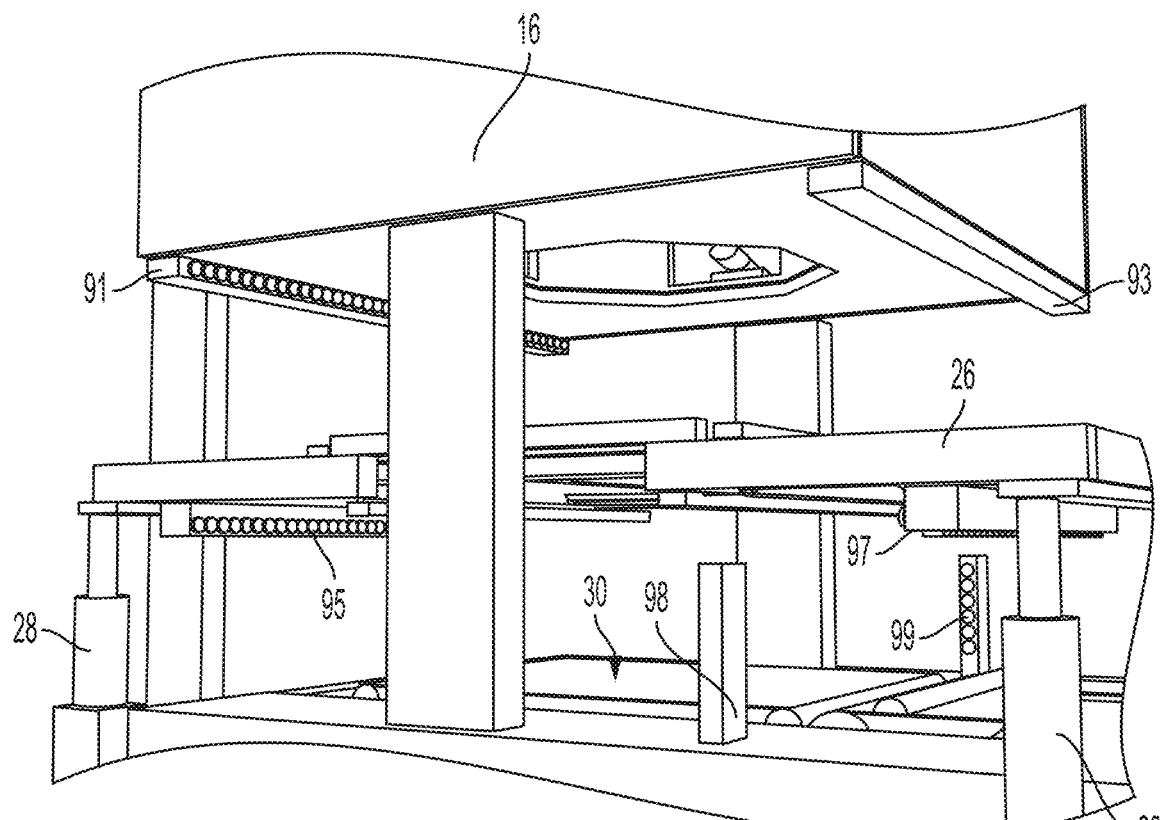
FIGS. 3A and 3B show illustrative diagrammatic enlarged views of the buffering system of FIG. 1 showing light curtains used therein from a front view (FIG. 3A) and a rear view (FIG. 3B)
Figure 3B:
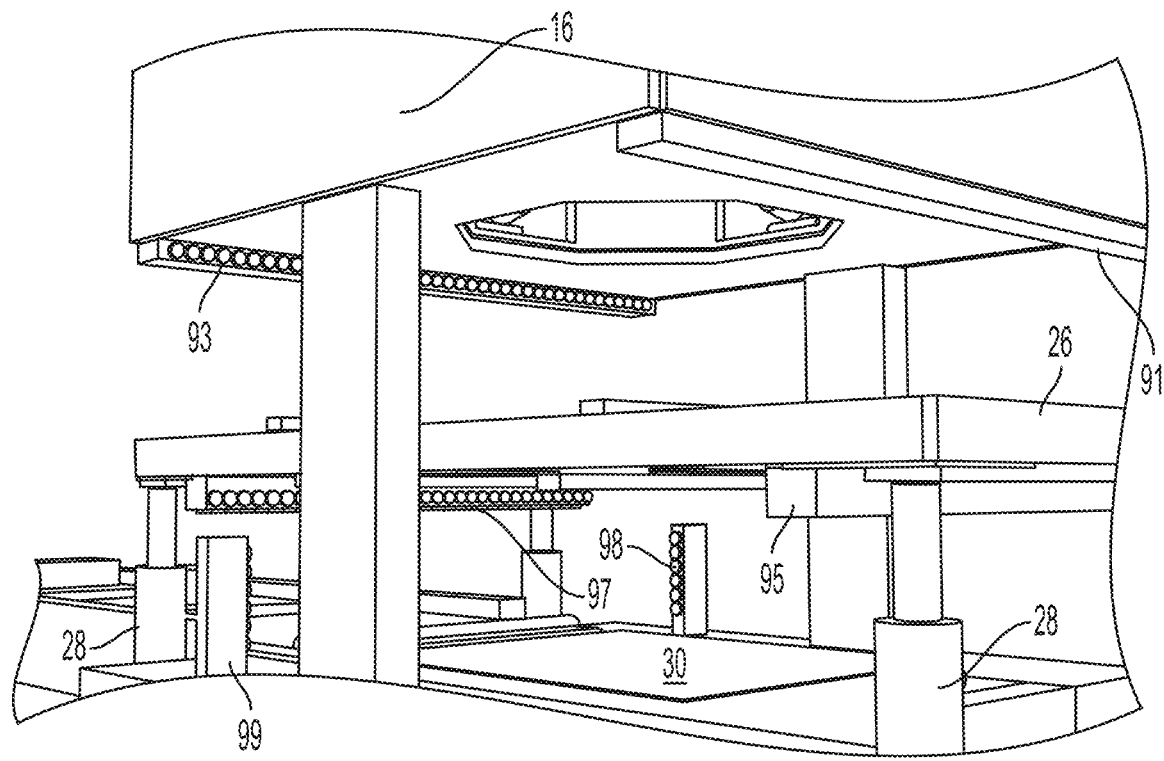

In accordance with certain aspects, the system may include detectors (e.g., such as light curtains or source/detector beam break systems) at the entry of the drop perception unit 16 as shown at 13, 15 in FIGS. 1-2D, as well as at the exit of the drop perception unit 16 as shown at 91, 93 in FIGS. 3A and 3B. Using these detectors the system will know when each object enters the drop perception unit 16, when each object exits the drop perception unit 16, and potentially whether more than one object has been passed through the drop perception unit when only one object was anticipated by the object processing system.

In accordance with further aspects, the system may include one or more cameras or 3D detectors 90, 92 that are directed toward the door(s) (e.g., at elevated and lowered positions), and one or more cameras or 3D detectors 94 that are directed toward the weighing system 30, as well as one or more cameras or 3D detectors 96 that monitor the movement of objects away from the weighing system 30 in the lower processing area 14. The cameras 90 may monitor objects (e.g., check for non-singularity), the camera(s) 92 may monitor objects on the weighing system 30 (e.g., to confirm an identify of the object), and the camera(s) 94 may monitor movement of objects to confirm that the weighing system is cleared. In accordance with further aspects, the buffering system may include opposing bands of emitters and detectors that provide a light curtain therebetween. The emitters may, for example, be LEDs (visible or infrared), and the detectors may be positioned opposing the emitters. In accordance with further aspects, reflectors may oppose the emitters, and detectors may be provided with the emitters. FIGS. 3A and 3B show the buffering system as discussed above with reference to FIGS. 2A-2D that includes emitter-detector pairs at the underside of the drop scanner 16 as shown at 91, 93, at the underside of the buffering system as shown at 95, 97, and at the exit of the weighing system 98, 99. The system of FIGS. 3A and 3B similarly includes a drop perception unit 16, a buffering system 18, and a weighing system 30 as discussed above. The emitter-detector pair 91, 93 detects when an object has left the drop scanner and should be on the buffering system. The emitter-detector pair 95, 97 detects when an object has been dropped by the buffering system onto the weighing system (and the buffering system is therefor available to receive a new object). The emitter-detector pair 98, 99 detects when an object has left the weighing system (and the weighing system is therefor available to receive a new object). Any of the systems disclosed herein may include any of cameras, 3D detectors, and light curtains as discussed herein.

Figure 4A:
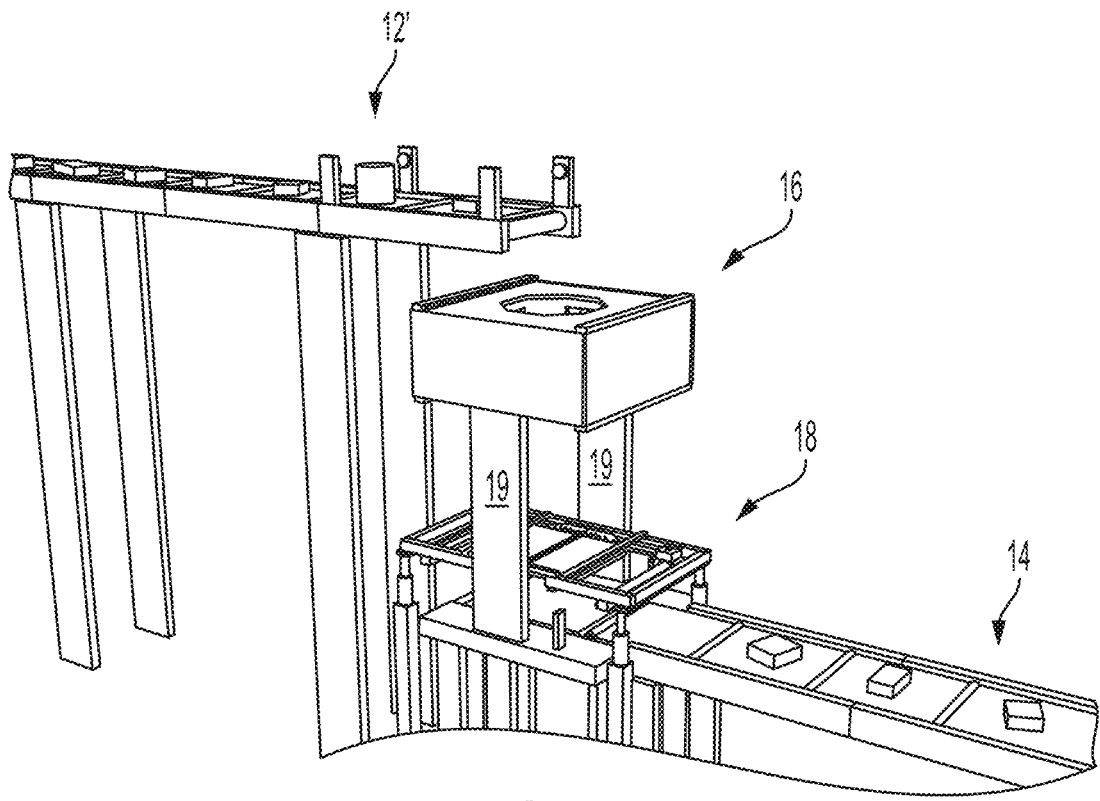
FIGS. 4A and 4B show illustrative diagrammatic views of a buffering system in accordance with a further aspect of the invention involving a more elevated separation between upper and lower processing locations (FIG. 4A) and involving the use of guide walls (FIG. 4B).
Figure 4B:
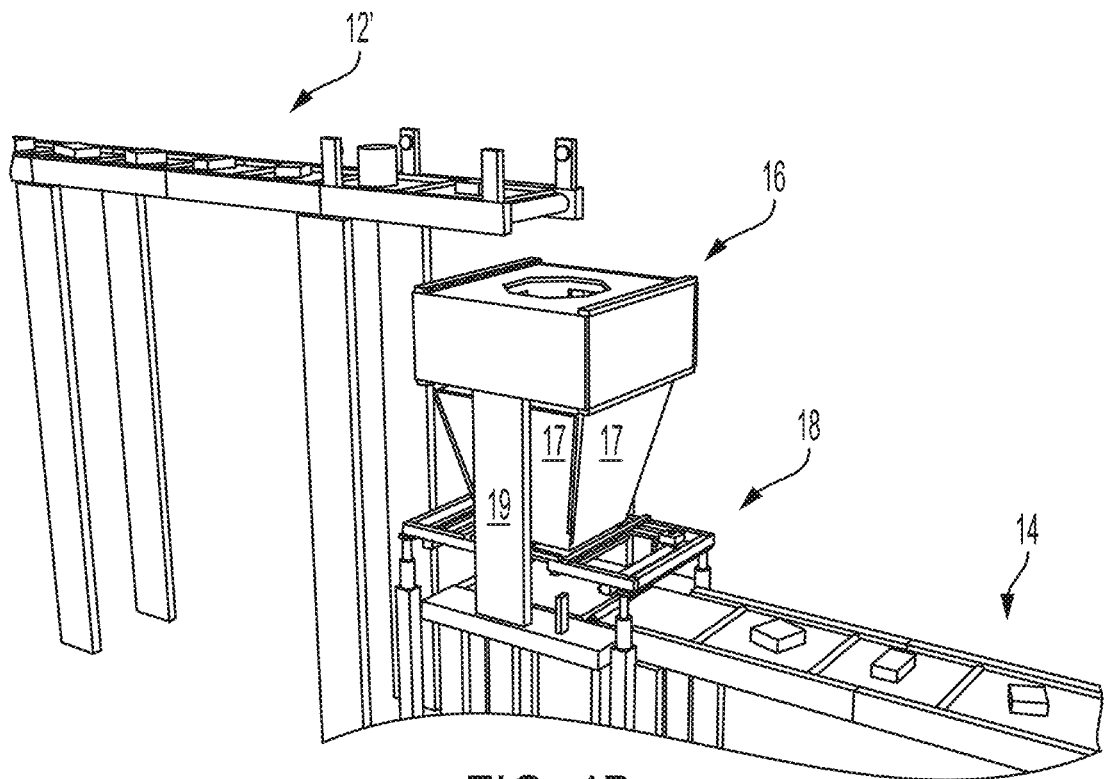

Any of the systems discussed herein may also include guide walls to prevent objects from bouncing off of or rolling off of the retractable doors. FIG. 4A, for example, shows a system that includes an upper processing area 12' and a lower processing area 14, wherein a more substantial drop is involved between the upper processing area 12' and the lower processing area 14. A drop perception system 16, buffering system 18, and weighing system 30 are provided as discussed above, but as shown in FIG. 4B, the system may be provided with guide walls 17 (e.g., on all four sides) between the drop perception system 16 and the buffering system 18. The guide walls may be provided at angles (funneled) and may terminate just above the buffering system 26, inhibiting objects from bouncing off of or rolling off of the retractable doors of the buffering system 18. The guide walls may also be mounted to supports 19 slightly below the drop perception system 16 to permit a light curtain (e.g., provided by emitter-detector pair 91, 93) to detect objects having fallen from the drop perception unit 16 as discussed above with reference to FIGS. 3A and 3B.

Figure 5A:
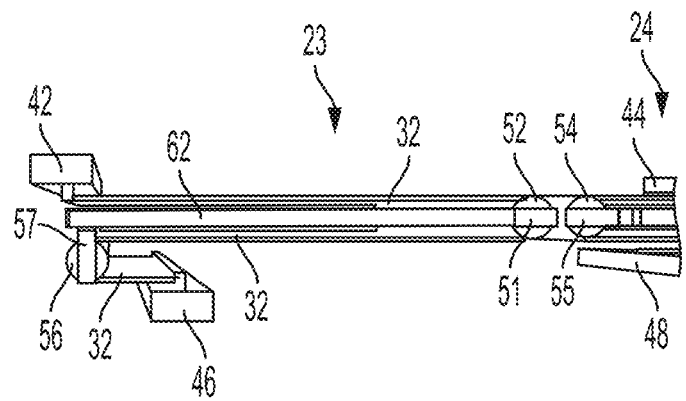
FIGS. 5A and 5B show illustrative diagrammatic enlarged end side views of retractable belt doors in the buffering system of FIG. 1 showing the retractable belt doors closed (FIG. 5A) and showing one retractable belt door open (FIG. 5B)
Figure 5B:
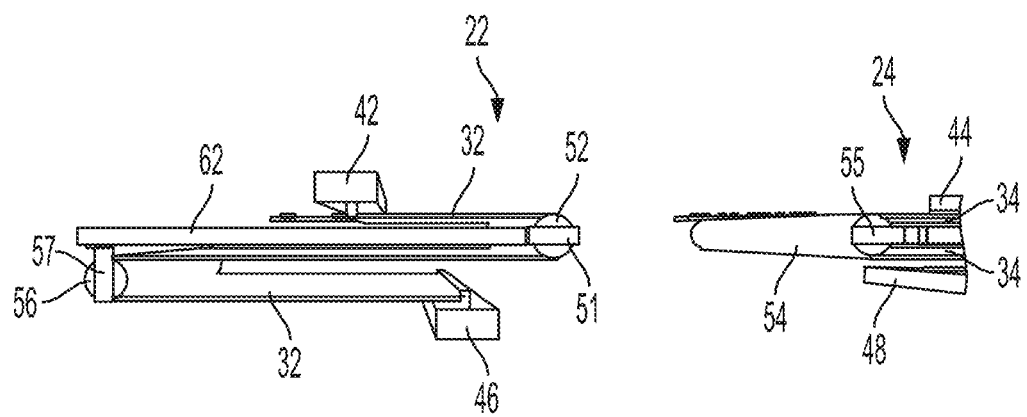
Figure 6A:
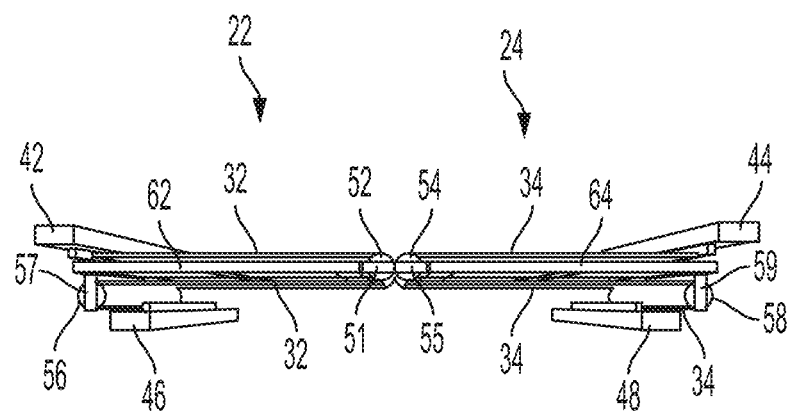
FIGS. 6A and 6B show illustrative diagrammatic enlarged central side views of retractable belt doors in the buffering system of FIG. 1 showing the retractable belt doors closed (FIG. 6A) and showing both retractable belt doors open (FIG. 6B)
Figure 6B:
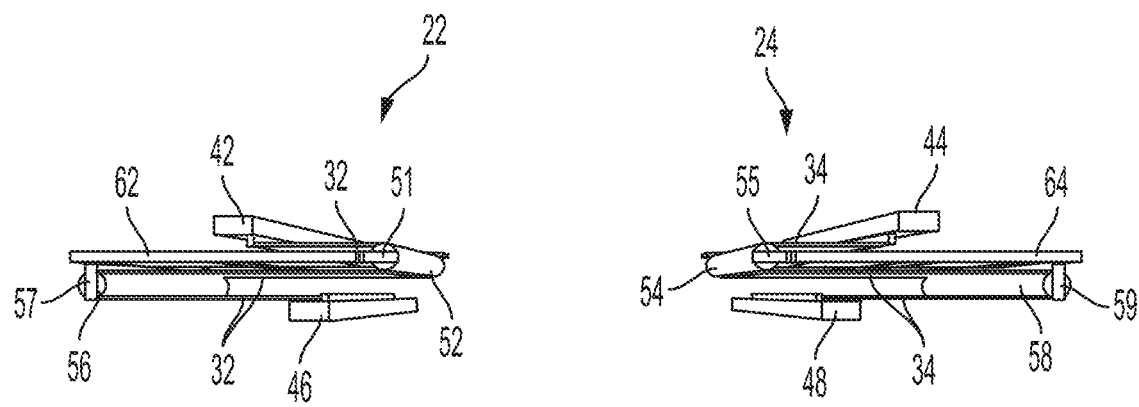

With reference to FIGS. 5A and 5B, each retractable belt door 22, 24 includes and is formed by a portion of a belt 32, 34. Each belt is fixed at an upper anchor 42, 44 as well as a lower anchor 46, 48 respectively. FIGS. 5A and 5B show one retractable belt door 22 being moved, and FIGS. 6A and 6B show two retractable belt doors being moved. In applications where only one retractable belt moves (e.g., in a system that includes only one belt), only one retractable belt door is provided. The belt 32 extends between the fixed upper anchor 42, around rollers 52, 56, and is attached to fixed lower anchor 46. The roller 52 is mounted on a horizontally extending mounting bracket 51 that extends from a retractable panel 62, and roller 56 is mounted on a downwardly extending mounting bracket 57 that extends from below the retractable panel 62. The rollers 54, 58 are similarly mounted on the retractable panel 62. It is movement of the panel 62 with respect to the fixed upper and lower anchors 42, 46 that causes the retractable belt door 22 to move.

Similarly, the belt 34 extends between the fixed upper anchor 44, around rollers 56, 58, and is attached to fixed lower anchor 48. The roller 54 is mounted on a horizontally extending mounting bracket 55 that extends from a retractable panel 64, and roller 58 is mounted on a downwardly extending mounting bracket 59 that extends from below the retractable panel 64. It is movement of the panel 64 with respect to the fixed upper and lower anchors 44, 48 that causes the retractable belt door 24 to move. Tensioners may also be provided within any of anchors 42, 44, 46, 48 to maintain tension on the belts 32, 34. The use of tensioners where the belt attaches to the frame act to pull the belt tight. In accordance with certain aspects, this may involve putting the top or bottom anchor bars on a lead screw that pulls one or both back. Further, by spring-loading the tensioners one may butt the rollers together (intentionally overlap them for a better seal) while taking up the slack generated thereby. FIGS. 13A-13H shows buffering system with such tensioners on the upper anchors.

Figure 7A:
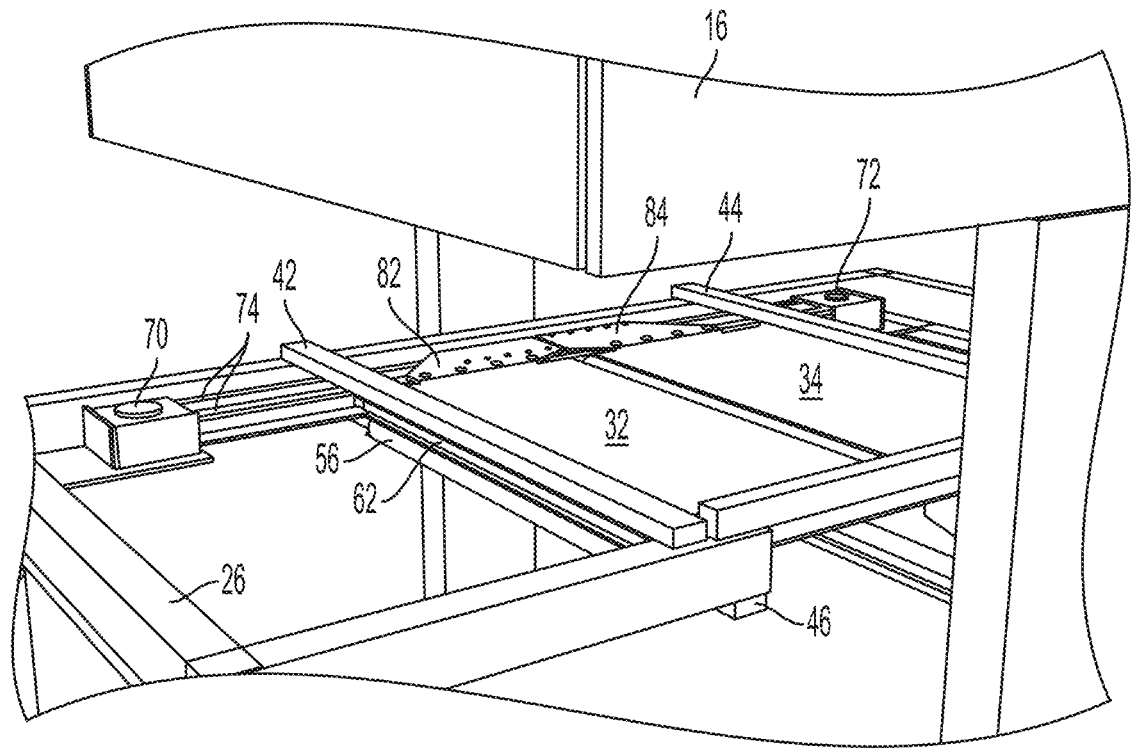
FIGS. 7A and 7B show illustrative diagrammatic enlarged side elevational front views of the buffering system of FIG. 1 showing the retractable doors closed (FIG. 7A) and showing the retractable belt doors open (FIG. 7B)
Figure 7B:
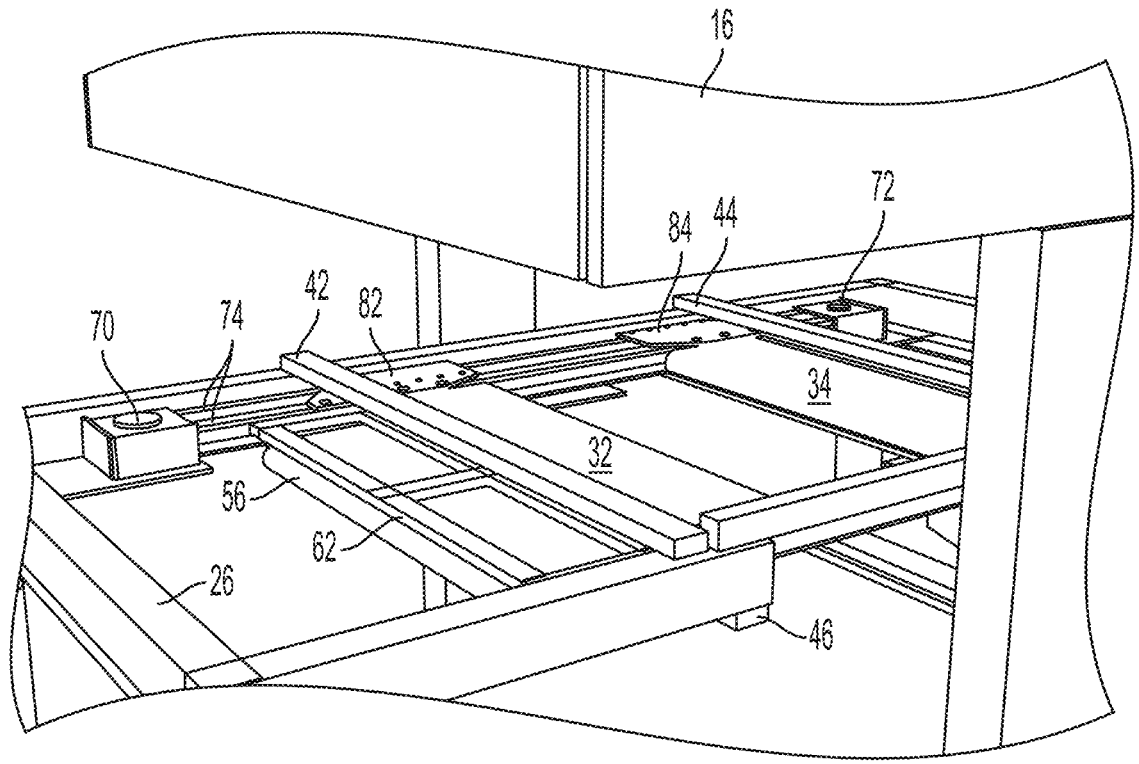
Figure 8A:
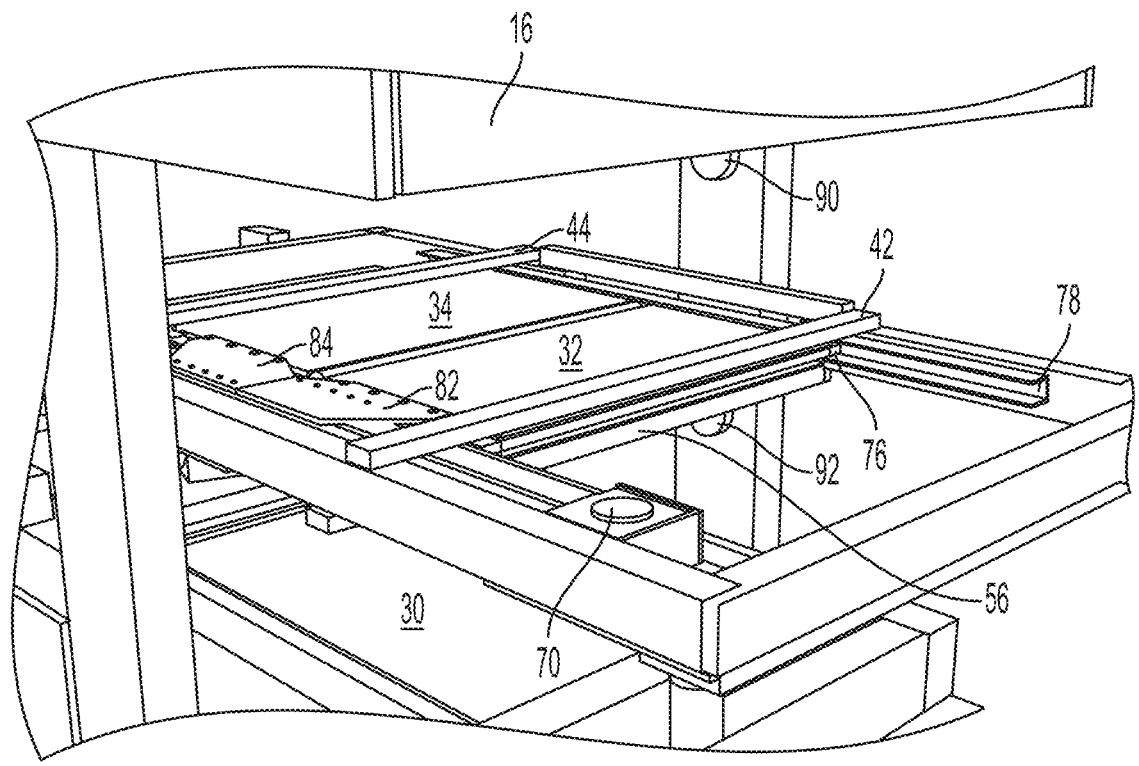
FIGS. 8A and 8B show illustrative diagrammatic enlarged side elevational rear views of the buffering system of FIG. 1 showing the retractable doors closed (FIG. 8A) and showing the retractable belt doors open (FIG. 8B)
Figure 8B:
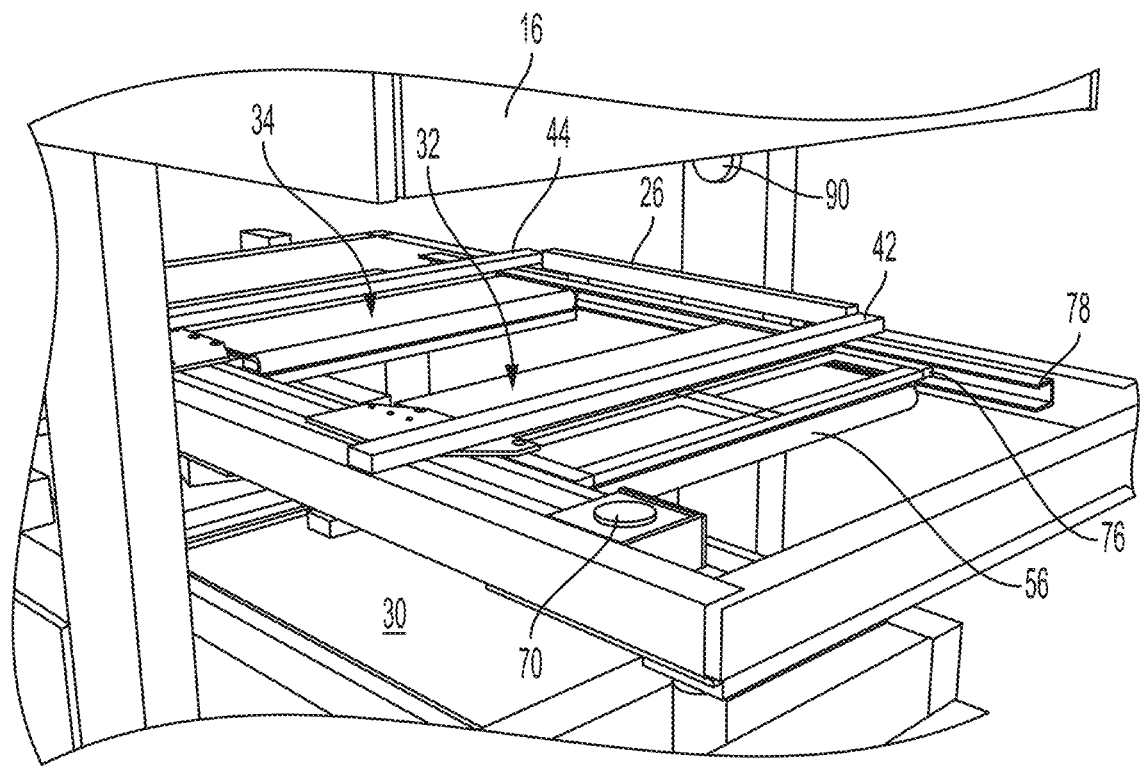

The frame 26 is not shown in FIGS. 5A, 5B, 6A and 6B for clarity. With reference to FIGS. 6A and 6B, the panels 62, 64 are moved reciprocally within the frame 26. Each panel is reciprocally movable by a reciprocating drive system that includes a drive motor 70 that reciprocally drives a belt 74 around a belt pulley 72 that includes a tensioner as shown in FIGS. 7A and 7B. FIG. 7A shows the retractable belts 32, 34 closed (to retain an object), and FIG. 7B shows the retractable belts 32, 34 open (to permit an object to fall between the retractable belt doors 22, 24 formed thereby as shown in FIGS. 5A and 5B). FIGS. 8A and 8B show opposite side views of the buffering system, showing that the panels 62, 64 are supported within the frame 26 by rails 76 that run along a track 78. FIG. 8A shows the retractable belt doors formed by belts 32, 34 closed (to retain an object), and FIG. 8B shows the retractable belt doors 22, 24 open (to permit an object to fall between the doors formed by belts 32, 34).

Figure 9A:
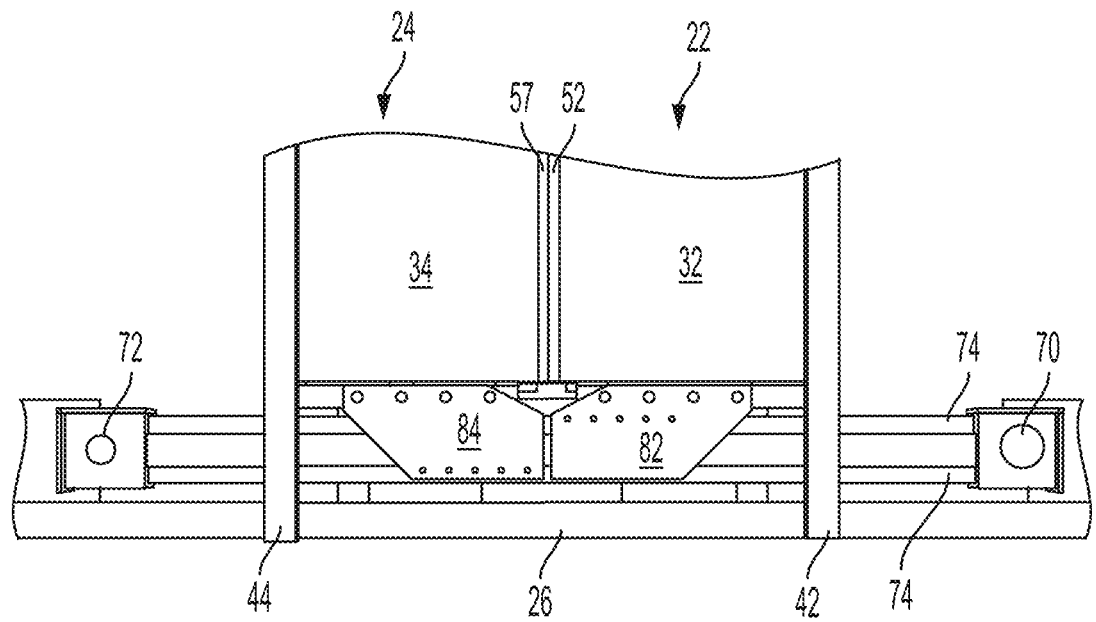
FIGS. 9A and 9B show illustrative diagrammatic plan views of the buffering system of FIG. 1 showing the retractable doors closed (FIG. 9A) and showing the retractable belt doors opening (FIG. 9B)
Figure 9B:
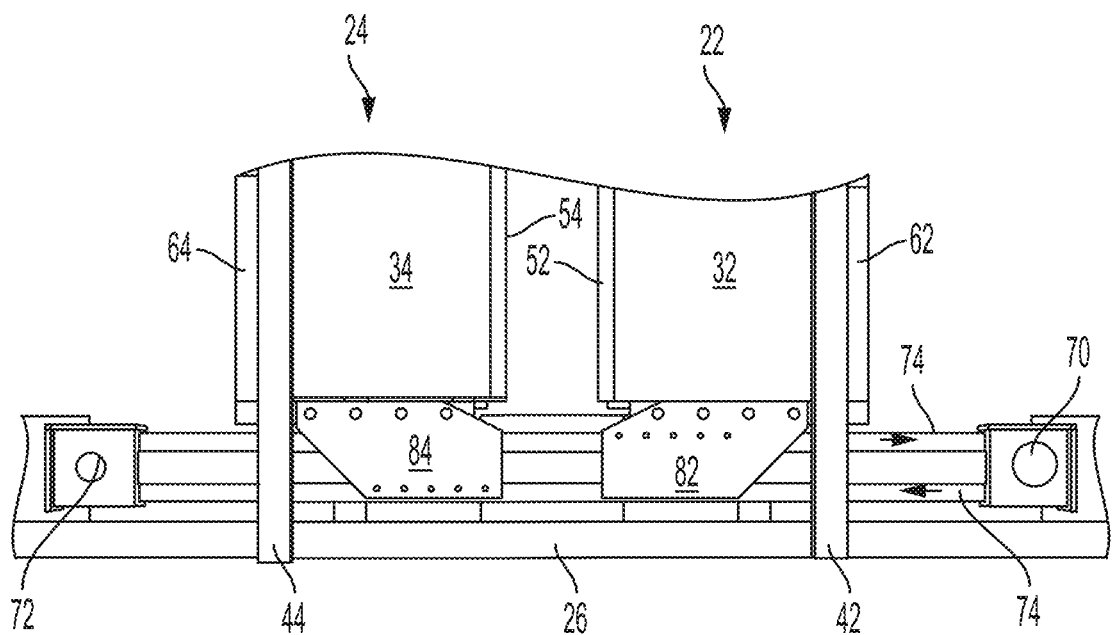

Each of the panels 62, 64 is attached to a brace 82, 84, and one brace 82 is attached to one side of the belt 74, while the other brace 84 is attached to the other side of the belt 74. With reference to FIGS. 9A and 9B, when the drive motor 70 moves the belt 74 as shown in FIG. 9B, the panels 62, 64 move away from each other because they are attached to different sides (inside and outside) of the belt 74. The two sides are therefore driven by the belt-driven linear slide. Each side is attached to an opposite side of the belt, so that the braces 82, 84 move in the opposite direction from each other. Reversing the direction of the motor 70 moves the panels 62, 64 toward each other. FIG. 9A shows the retractable belt doors 22, 24 closed (to retain an object), and FIG. 9B shows the retractable belt doors 22, 24 open (to permit an object to fall between the doors 22, 24).

The belts 32, 34 roll over the rollers 52, 54, 56, 58 that retract with panels 62, 64. The belts 32, 34 are anchored at fixed attachment points 42, 44, 46, 48 on the frame 26. The purpose of the outer rollers 56, 58 is to take up the slack of the belts 32, 34 as the inner rollers 52, 54 retract. Thus the relative placement of the two rollers, the path of their retraction, and the anchor points are all designed such that (1) the belt is always taut or in tension; (2) the parts of the belt used to catch the objects always have zero velocity (until the parts roll over the conveyor in the action of peeling away); and (3) such that there need only be one degree of freedom in the system: only the rollers need be moved.

In accordance with various aspects therefore, the system may include one or two retractable belt doors (one is shown opening in FIGS. 5A and 5B, and two are shown opening in FIGS. 6A and 6B). The retractable belt door(s) serves to catch objects as they fall, and each retractable belt door(s) is/are forced to peel away and retract from the object so that the object may drop onto a lower surface below the door(s). A weighing system 30 need not be used in accordance with an aspect, and the buffering system 18 may serve as a temporary buffer for a variety of receiving systems that receive objects from above where it is desired to absorb impact of an object from a fall prior to reaching a receiving system.

Again, one retractable belt door only (e.g., 22) may be used. The optional second door (e.g., 24) provides for a fixed-sized object, a fixed velocity peel away action that results in a drop that is twice as fast compared with a system having the single-sized retractable belt door. A two door buffering system will also tend to induce less angular momentum on items since a center-dropped object will tend to be supported by both sides, whereas an item will start tip as soon as the roller peels away beyond the center of mass of the item when using a single door. Further, and as disclosed herein, a two door buffering system may be actuated with a single reciprocating mechanism. It is generally desired that the object never slides on the belt(s), and the retraction motion peels away one or both sides of the belt away from the object from underneath it. The device will therefore tend not to impart lateral motion to the item. The system is furthermore low in profile, so the resulting drop height is comparatively low. Thus instead of a drop through the drop scanner of as much as 6 feet, the buffering system allows a reduction of drop height onto a receiving surface to as little as 18 inches, perhaps less, from the retractable belt doors.

Figure 10A:
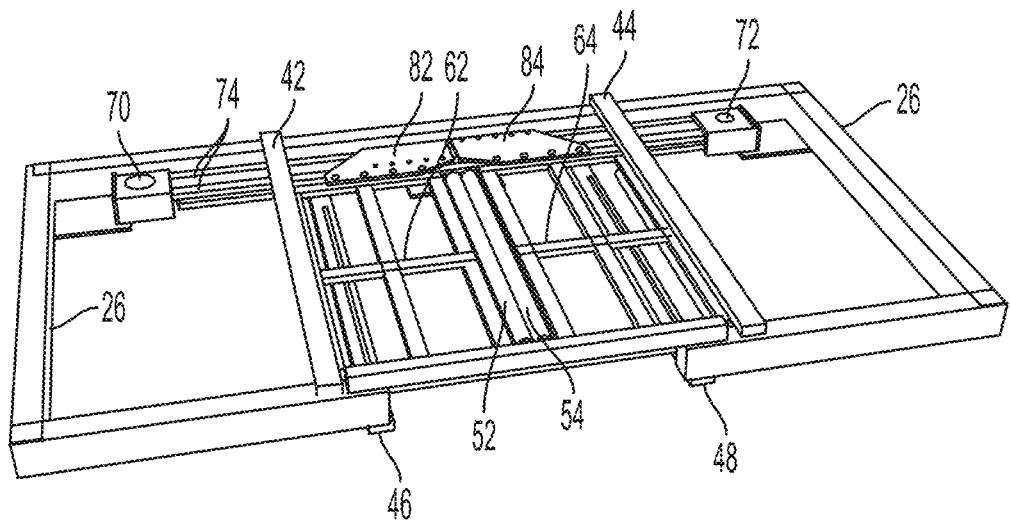
FIGS. 10A and 10B show illustrative diagrammatic enlarged side elevational front views of the retractable belt doors and frame of the buffering system of FIG. 1 showing the retractable doors closed (FIG. 10A) and showing the retractable belt doors open (FIG. 10B)
Figure 10B:
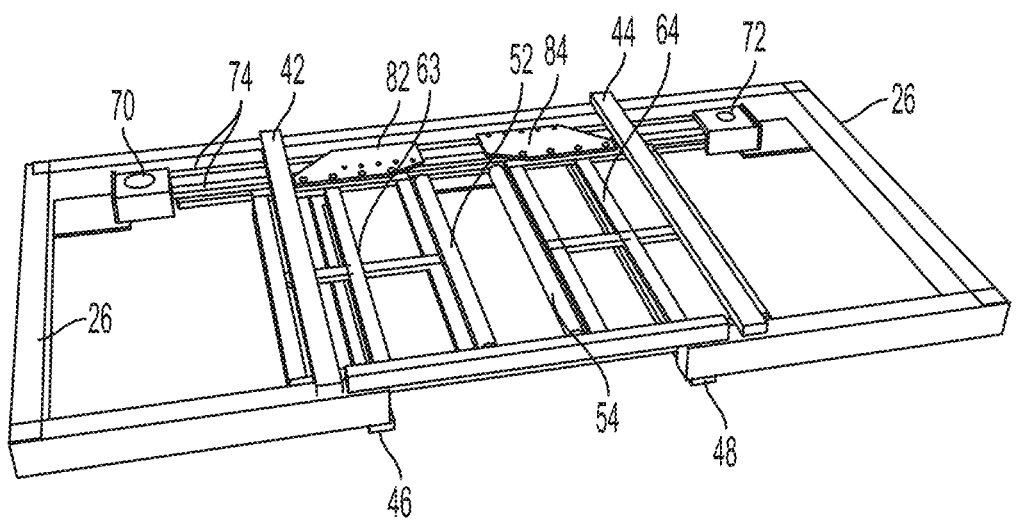

FIGS. 10A and 10B show the buffering system without the belts to 1) show the relative movement of the panel 62 (and rollers) with respect to the fixed attachment points 42, 46 (and frame 26), and 2) show the relative movement of the panel 64 (and rollers) in an opposite direction with respect to the fixed attachment points 44, 48 (and frame 26). Again, the belt 74 driven by the motor 70 moves the braces 82, 84 away from each other (FIG. 10B), causing the panels 62, 64 (and rollers) to move away from each other. Again, and with reference to FIGS. 8A and 8B, the sides of the panels 62, 64 opposite the braces 82, 84, are attached to rails 76 that ride along tracks 78.

Figure 11A:
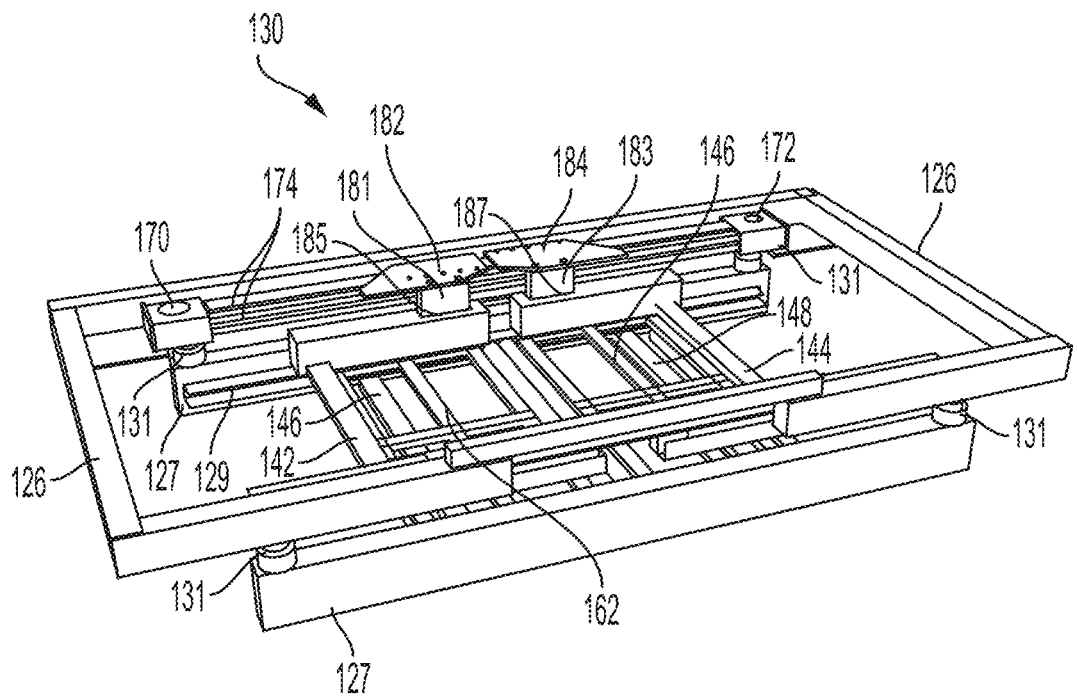
FIGS. 11A-11C show illustrative diagrammatic views of a buffering system in accordance with a further aspect that includes a sub-fame suspended from an upper frame showing the retractable belts closed (FIG. 11A), showing the retractable belts opened and the sub-frame lowered (FIG. 11B), and showing the retractable belts opened and the sub-frame again raised (FIG. 11C)
Figure 11B:
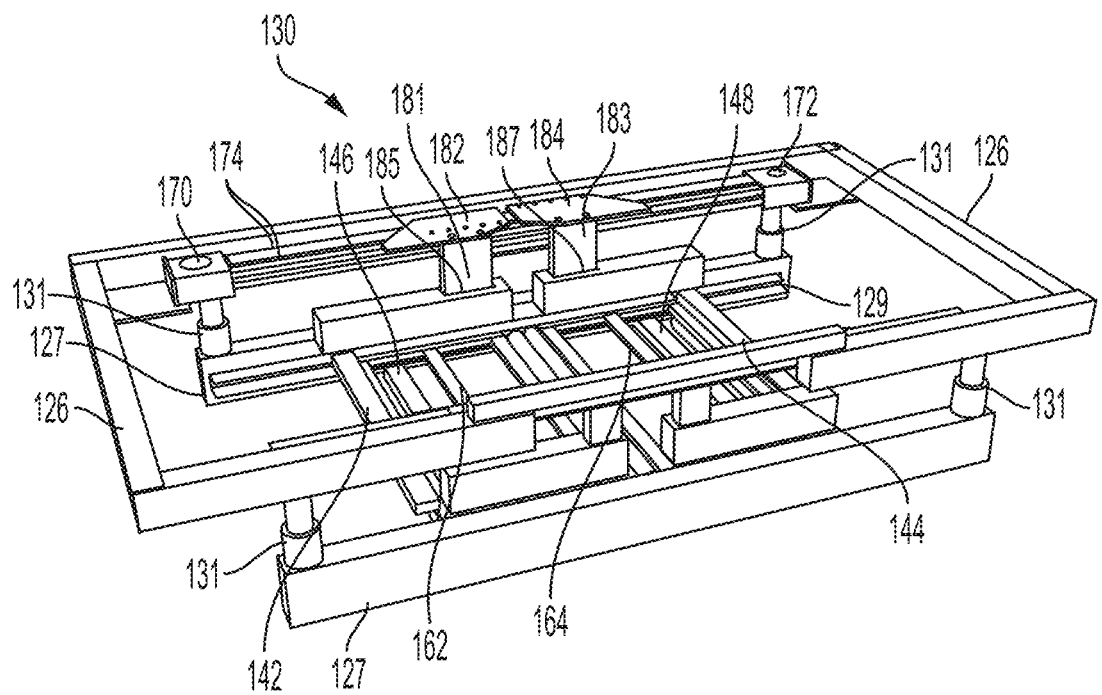

The transmission of any impact force on the buffering system to the retraction mechanism may be made so as to reduce transmission of the impact to the retraction mechanism in accordance with certain aspects of the invention. This might be accomplished for example, by having a panel for a retractable belt door driven by a knob that falls into a slot that the motor drives in certain applications. FIGS. 11A and 11B for example, show a buffering system 130 that includes panels 162, 164 that are respectively driven by braces 182, 184 via motor 170, pulley wheel 172 and belt 174. Again, the belts are omitted in the drawings to show the buffering system without the belts to 1) show the relative movement of the panel 162 (and rollers) with respect to the fixed attachment points 142, 146, and 2) show the relative movement of the panel 164 (and rollers) in an opposite direction with respect to the fixed attachment points 144, 148.

Again, the belt 174 driven by the motor 170 moves the braces 182, 184 away from each other (FIG. 11B), causing the panels 162, 164 (and rollers) to move away from each other. In the buffering system 130 however, the panels 162, 164 are mounted for movement along tracks 129 on a subframe 127. The subframe 127 is suspended below the frame 126 by upwardly biased suspension mechanisms 131, and when a large force is exerted on the panels 162, 164 (a heavy of fast moving object is received), the subframe 127 receives the impact by moving downward with respect to the frame 126 via the suspension mechanism that extends against a bias as shown in FIG. 9B.

Figure 11C:
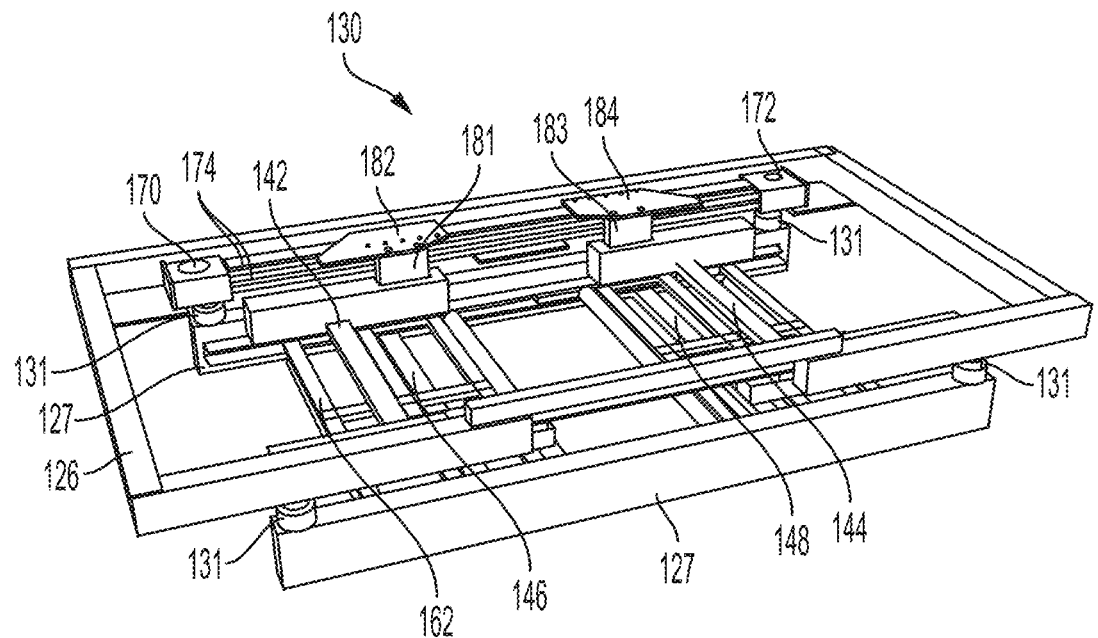

The sub-frame 127 may then return to a higher position as shown in FIG. 11C, and panels may then be opened, permitting the retractable belt doors to open as discussed above. The reciprocating drive mechanism is unaffected by the impact because each brace 182, 184 is coupled to a respective panel 162, 164 via a post 181, 183 that is received in a slot 185, 187 respectively. In particular, post 181 slides within slot 185 when an impact is received, and post 183 slides within slot 187 when an impact is received as shown in FIG. 11B. The use of the suspended sub-frame 127, and posts 181, 183 in slots 185, 187 permits the retractable belt panel assemblies to receive substantial impact without adversely affecting the reciprocating mechanism that provides retraction of the panels 162, 164.

Figure 12:
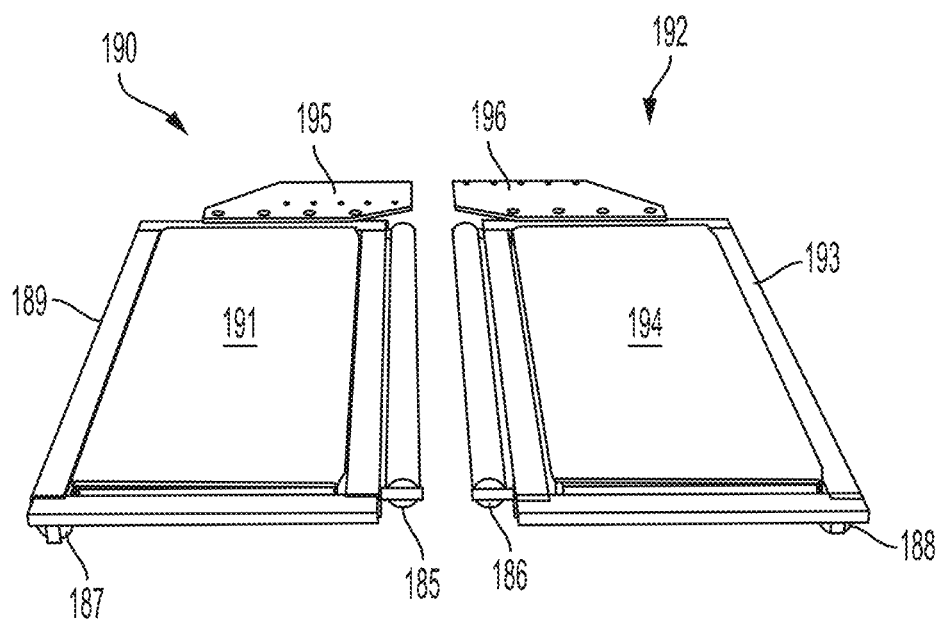
FIG. 12 shows an illustrative diagrammatic top view of the buffering system of FIGS. 11A-11C.

In accordance with further aspects, cushioning may be provided on the platform below the belt to help with impact from falling packages. FIG. 12 shows two panel assemblies 190, 192 that each include rollers and are attached to a brace. In particular, panel assembly 190 includes a horizontally extending forward roller 185, and downwardly extending rear roller 187, and panel assembly 192 includes a horizontally extending forward roller 186, and downwardly extending rear roller 188. The panel assembly 190 also includes a panel frame 189 and a cushioned material (e.g., open or closed cell polymeric or elastomeric material) 191, and the panel assembly 192 includes a panel frame 193 and a cushioned material (e.g., open or closed cell polymeric or elastomeric material) 194. Belts ride just over the cushioned materials 191, 194 respectively, providing some absorption for any impact on the panel assemblies. The roller assemblies 190, 192 may be used in each of the systems discussed herein.

Figure 13A:
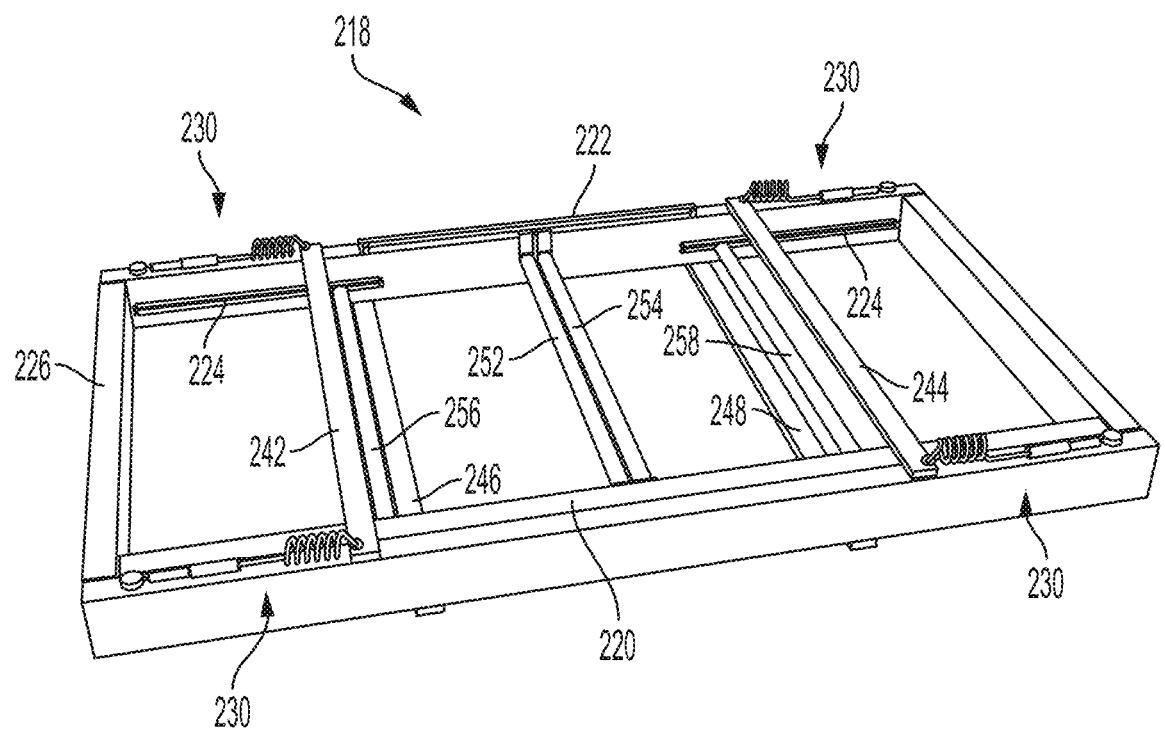
FIGS. 13A-13H show illustrative diagrammatic views of a buffering system in accordance with an aspect of the present invention that includes a linear actuator, showing the buffering system without belts in an open position (FIG. 13A), showing the buffering system without belts in a closed position (FIG. 13B), showing the buffering system with belts in an open position (FIG. 13C), showing the buffering system with the belts in an open position (FIG. 13D), showing the buffering system from an underside showing the linear actuator in the closed position (FIG. 13E), showing the buffering system from an underside showing the linear actuator in an open position (FIG. 13F); showing an enlarged view of a follower track side of the buffering system (FIG. 13G), and showing an enlarged view of a linear actuator side of the buffering system (FIG. 13H)
Figure 13B:
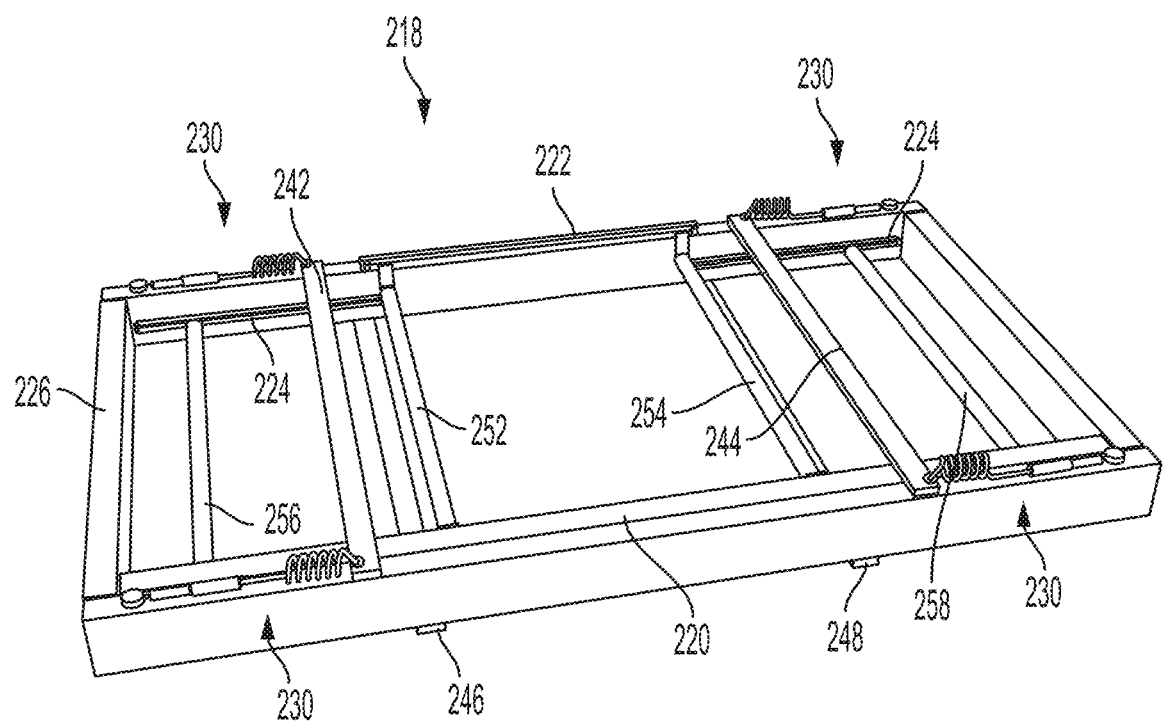

Buffering systems in accordance with further aspects may include a variety of drive systems such as pneumatic drive systems, electrical drive systems, rack-and-pinion drive systems, lead screw drive systems, linear actuators, etc. FIGS. 13A-13H for example, show a buffering system with a dual linear actuator to power each of two retractable belt doors. With reference to FIG. 13A the buffering system 218 includes a linear actuator system 220 that drives two sets of rollers at one end thereof, with the opposing ends of the rollers being coupled to brackets that run along an upper follower track 222 and lower follower tracks 224. One set includes rollers 252 and 256, while the other set includes rollers 254, 258. With further reference to FIG. 13B the first set of rollers 252, 254 moves toward one end of the buffering system frame 226, while the second set of rollers 254, 258 moves to the opposite end of the buffering system frame 226. In particular, the first set of rollers 252, 256 moves with respect to an upper anchor 242 and a lower anchor 246, while the second set of rollers 254, 258 moves with respect to a lower anchor 248. The buffering system is shown in FIGS. 13A and 13B without the belts for clarity. Each belt is respectively anchored to the upper and lower anchors as discussed previously with regard to FIGS. 1-12. The upper anchors 242, 244 may each be attached to the frame 226 via a biasing system 230 (such as springs that couple to the frame 226 via turnbuckle adjustments). The biasing system will act to keep the belts tight around the rollers in the event that the belts stretch or the system permits the rollers to move small amounts toward each other, and may further be used to allow the opposing rollers to fully contact each other when closed.

Figure 13C:
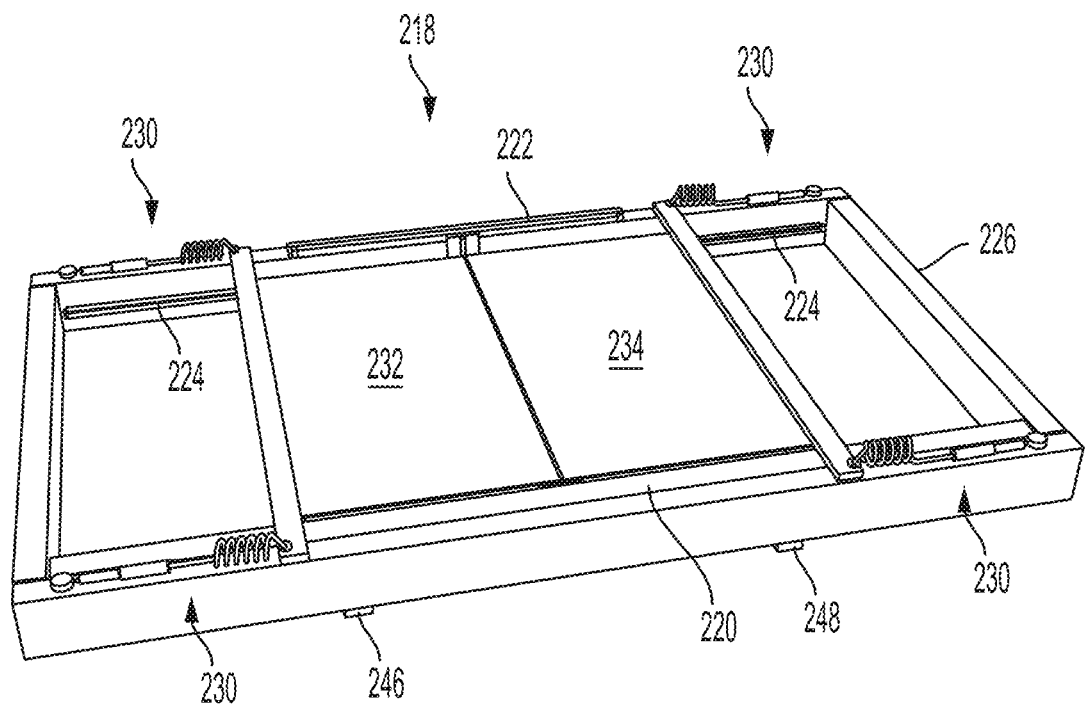
Figure 13D:
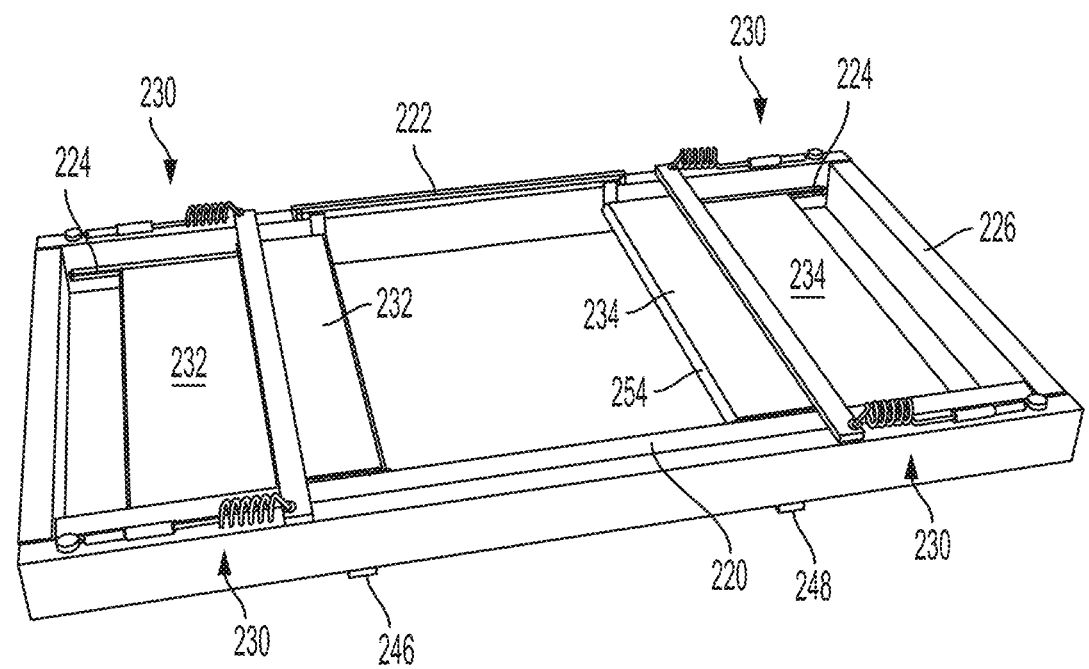
Figure 13E:
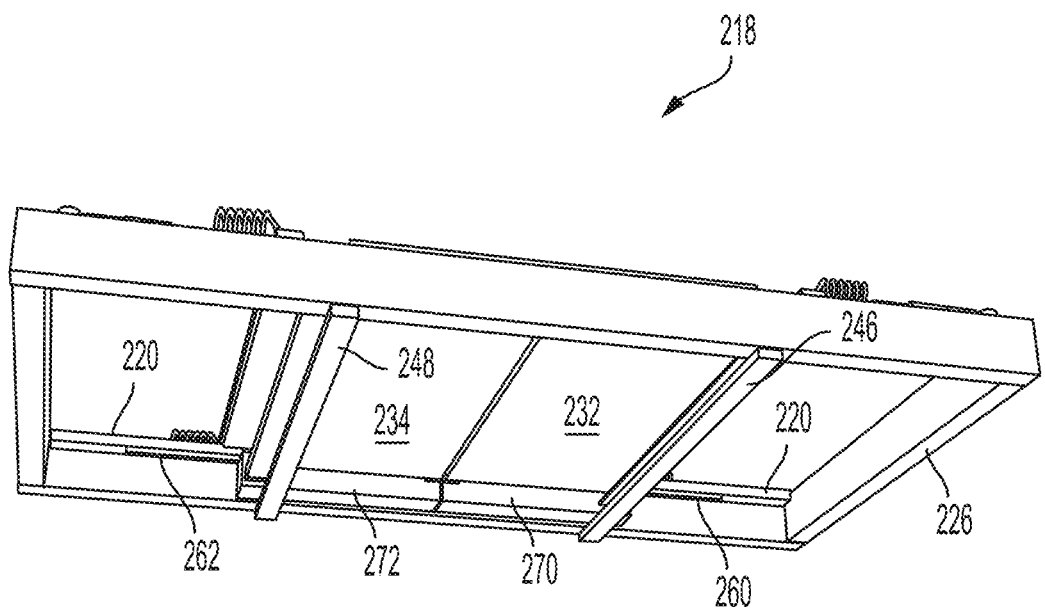
Figure 13F:
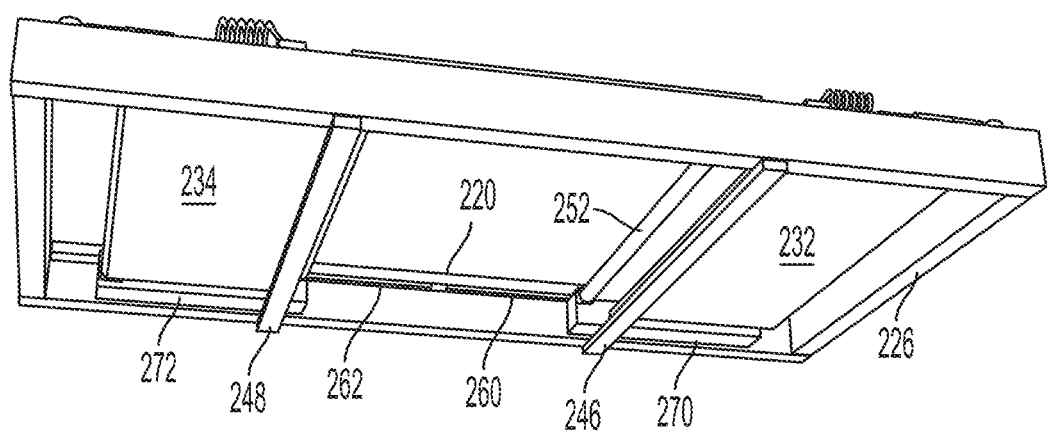
Figure 13G:
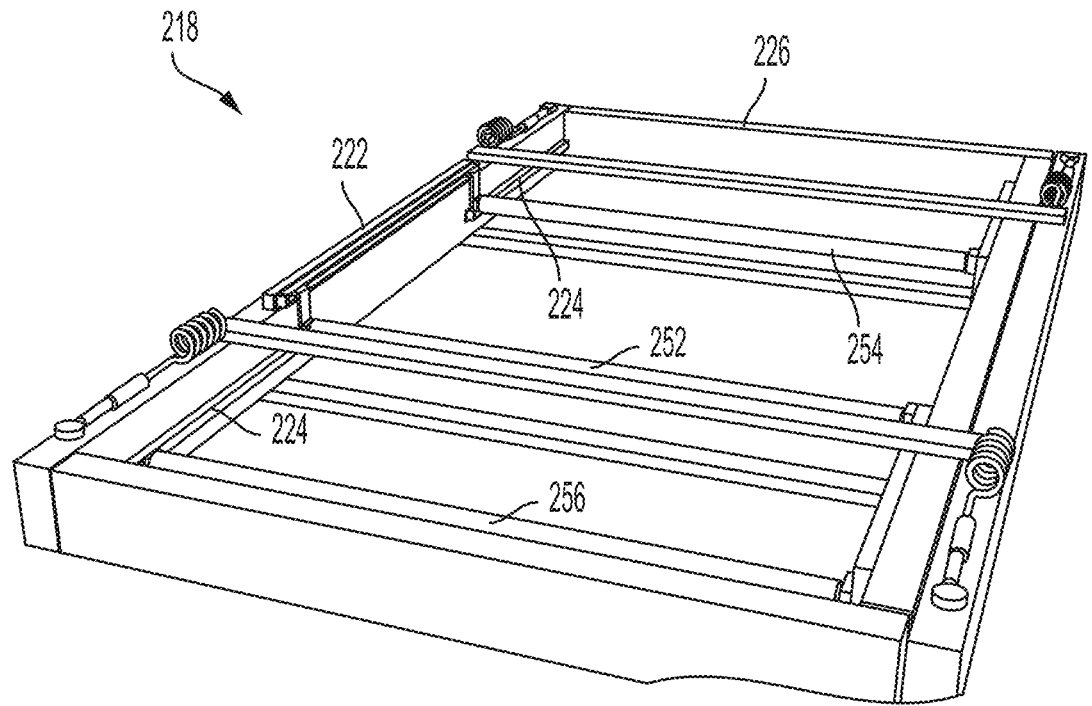
Figure 13H:
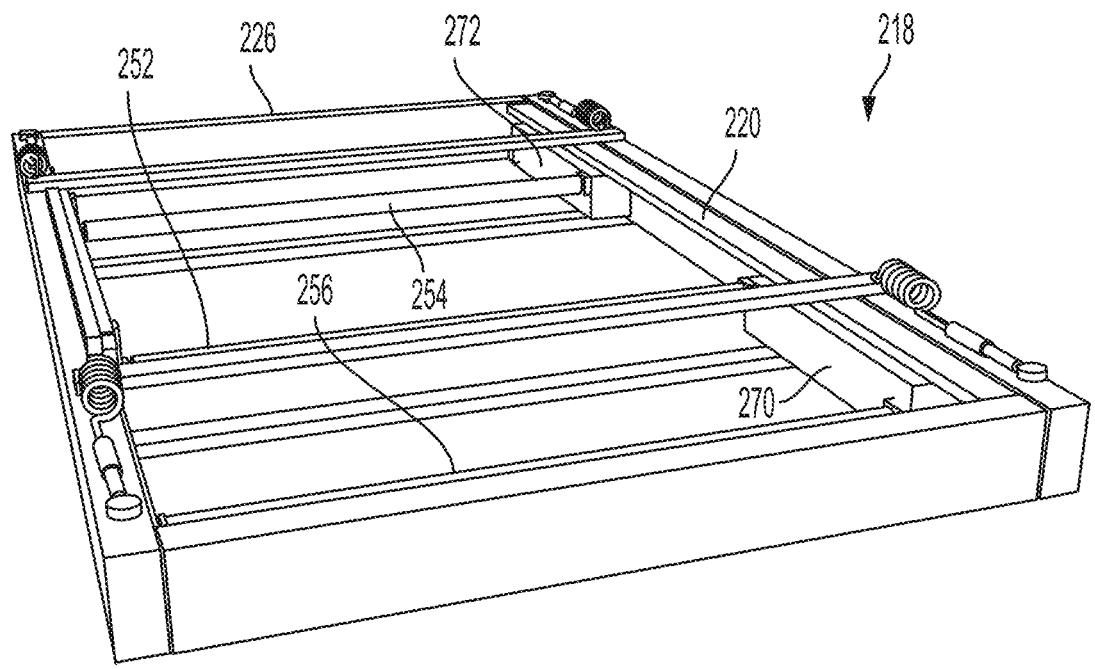

With reference to FIGS. 13C and 13D (with the belts 232, 234 included), the buffering system provides that the retractable belt doors may be closed to receive an object (as shown in FIG. 13C) and subsequently opened (as shown in FIG. 13D) to drop the object to a system below. The linear actuator system 220 includes two drive portions that drive two drive units. FIG. 13E shows an underside view of the linear actuator side of the buffering system, showing the two drive units 270, 272 that travel along tracks 260, 262. FIG. 13E shows the retractable belt doors in a closed position and FIG. 13F shows the retractable belt doors in an opened position. The rollers 252, 256 are rotatably coupled to the drive unit 270, and the rollers 254, 258 are rotatably coupled to the drive unit 272. The opposite ends of the rollers are slidably and rotatably coupled to slide mechanisms that run along tracks 222, 224 as shown in FIG. 13G. FIG. 13H shows the linear actuator side including the drive units 270, 272 that reciprocate under opposing direction drive elements of the linear actuator system 220.

In accordance with further aspects, the buffering system may include linear actuators on both sides of the frame such that two linear actuators move rollers 252, 256 and two linear actuators move rollers 254, 258 (and therefore no follower tracks are used). The system of FIGS. 13A-13H further does not require a panel on which the rollers are mounted, only that the rollers are coupled to a drive unit 270, 272 and either a track system (as shown) or another set of drive units with a further linear actuator system on the opposing side.

Figure 14A:
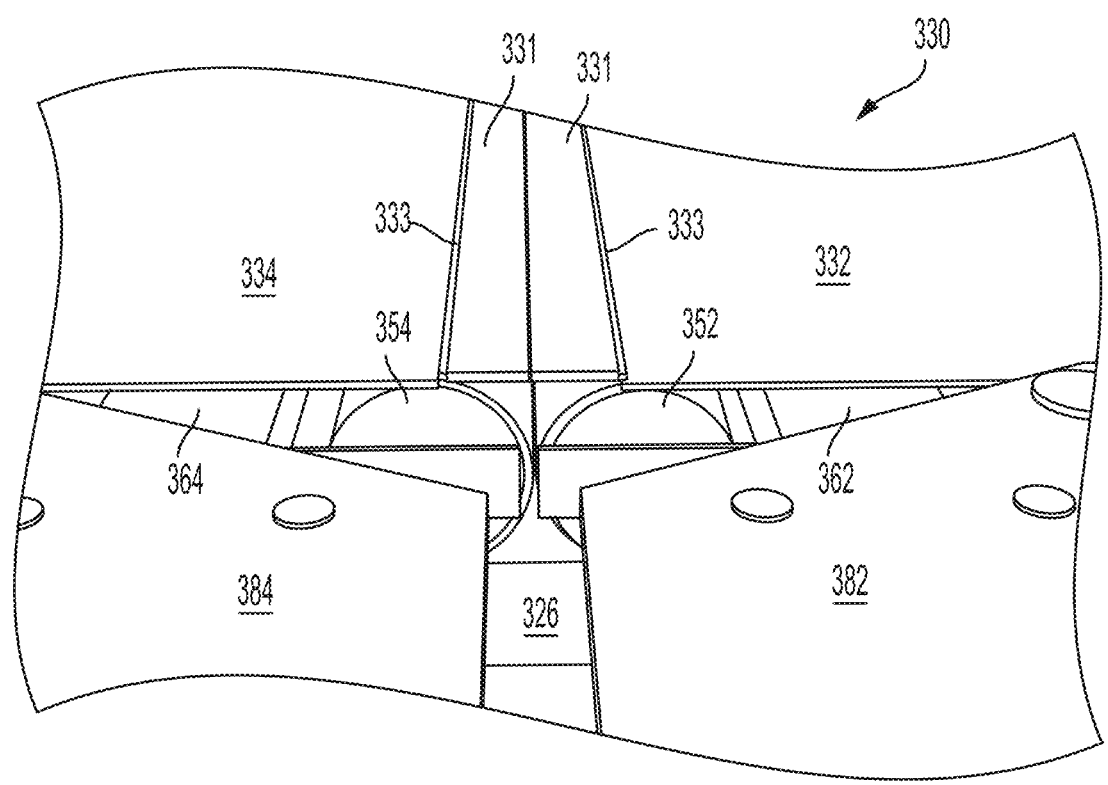
FIGS. 14A and 14B show illustrative diagrammatic enlarged views of rollers and gap features on belts in a system in accordance with an aspect of the present invention with the rollers in a closed position (FIG. 14A) and in an open position (FIG. 14B)
Figure 14B:
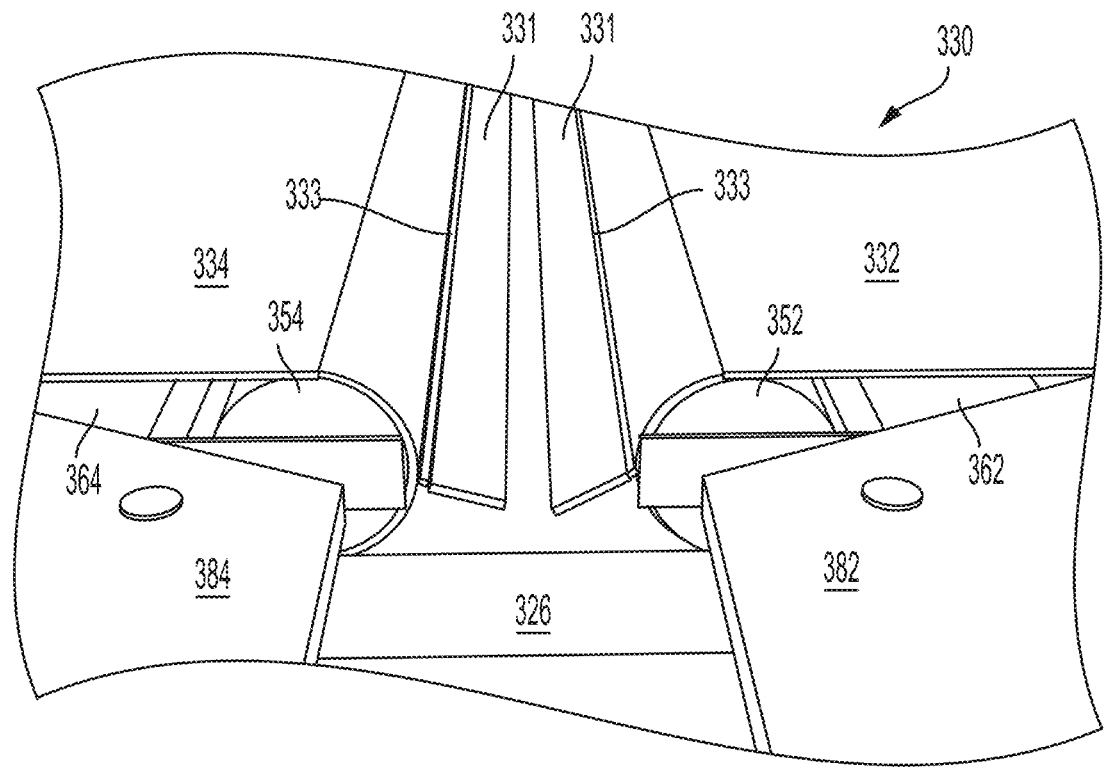

In accordance with further aspects, the buffering systems of the invention may include a meshing feature that completely seals the space where the rollers butt into each other when the reciprocating belt doors are closed. The meshing feature may include a strip or flap glued or welded to the belt at the belt positions determined when the door is fully closed. For example, FIGS. 14A and 14B show a portion of a buffering system 330 that includes two retractable belt doors, one formed in part by belt 332, roller 352 and panel 362, and the other formed in part by belt 334, roller 354 and panel 364, each of which functions as discussed above with reference to the preceding embodiments. The belts 332, 334 however, further include gap-closing features 331 on flexible mounting strips 333 that are attached to each belt 332, 334. With reference to FIG. 14A, when the rollers 352 and 354 are the closest to each other, the features 333 extend out toward each other to close the gap between the rollers 352, 354. When the panels 362, 364 are moved away from each other (via braces 382, 384 moving as discussed above), the features 333 rotate downward and away from each other as shown in FIG. 14B. Belts with such features may be used in any of the embodiments discussed herein.

Figure 15A:
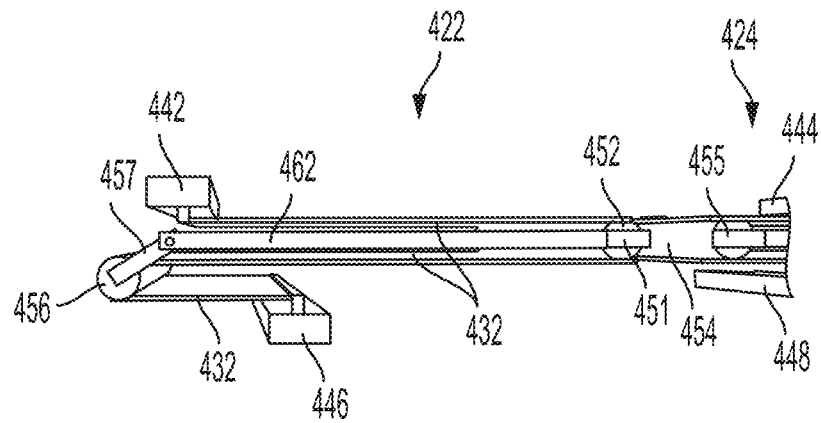
FIGS. 15A and 15B show illustrative diagrammatic enlarged end side views of retractable belt doors in a buffering system that includes pivoting rollers to provide a lower profile, showing the retractable belt doors closed (FIG. 15A) and showing one retractable belt door open (FIG. 15B)
Figure 15B:
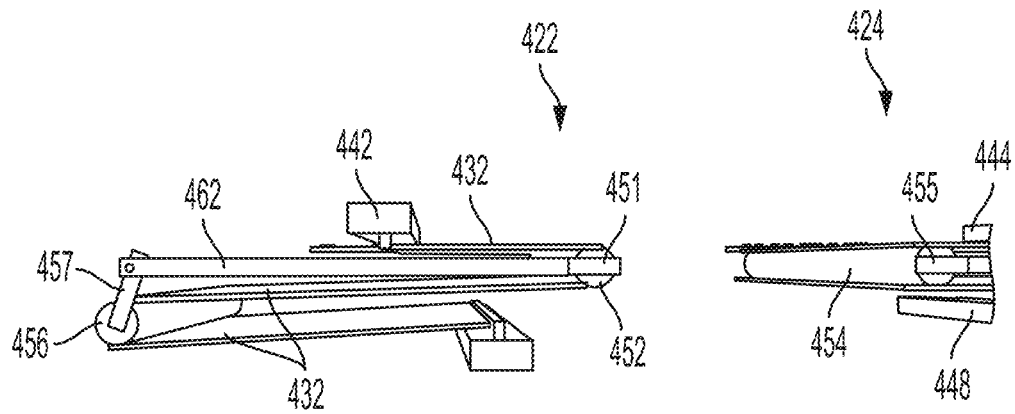

In accordance with yet further aspects, a lower profile of the buffering system may be provided by changing the path of the rear/exterior rollers to e.g. pivot down through an arc while keeping the top one sliding horizontally in order to lower the profile of the assembly and reduce the drop. FIGS. 15A and 15B show views of a portion of a buffering system 430 similar to the views shown in FIGS. 5A and 5B, and the buffering system is similar to those discussed above, except that the rear/exterior rollers pivot down through an arc in order to lower the profile of the assembly. In particular, each retractable belt door 422, 424 includes and is formed by a portion of a belt 432, 434. Each belt is fixed at an upper anchor 442, 444 as well as a lower anchor 446, 448 respectively. FIGS. 15A and 15B show one retractable belt door 322 being moved for purposes of explanation. Again, in applications where only one retractable belt moves (e.g., in a system that includes only one belt), only one retractable belt door is provided. The belt 432 extends between the fixed upper anchor 442, around rollers 452, 456, and is attached to fixed lower anchor 446. The roller 452 is mounted on a horizontally extending mounting bracket 451 that extends from a retractable panel 462, and roller 456 is mounted on a pivoting mounting bracket 457 that extends outward from the retractable panel 462, and pivots through an arc as the panel 462 is moved (as shown in FIG. 15B). It is movement of the panel 462 with respect to the fixed upper and lower anchors 442, 446 that causes the retractable belt door 422 to move, and the pivoting mount 457 permits the buffering system to provide a lower profile. Tensioners may also be provided within any of anchors 442, 444, 446, 448 to maintain tension on the belts 432, 434. The use of tensioners where the belt attaches to the frame act to pull the belt tight. In accordance with certain aspects, this may involve putting the top or bottom anchor bars on a lead screw that pulls one or both back. Further, by spring-loading the tensioners one may butt the rollers together (intentionally overlap them for a better seal) while taking up the slack generated thereby.

Figure 16A:
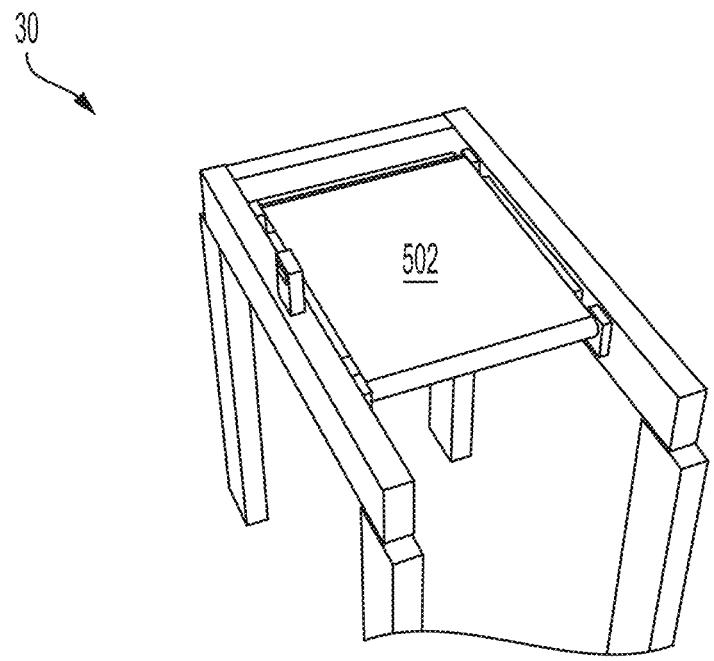
FIGS. 16A and 16B show illustrative diagrammatic views of a weighing system for use with a buffering system in accordance with an aspect of the present invention wherein the weighing system includes a highly sensitive scale and a belt, showing the belt (FIG. 16A) and a cutaway showing the scale within the belt (FIG. 16B)
Figure 16B:
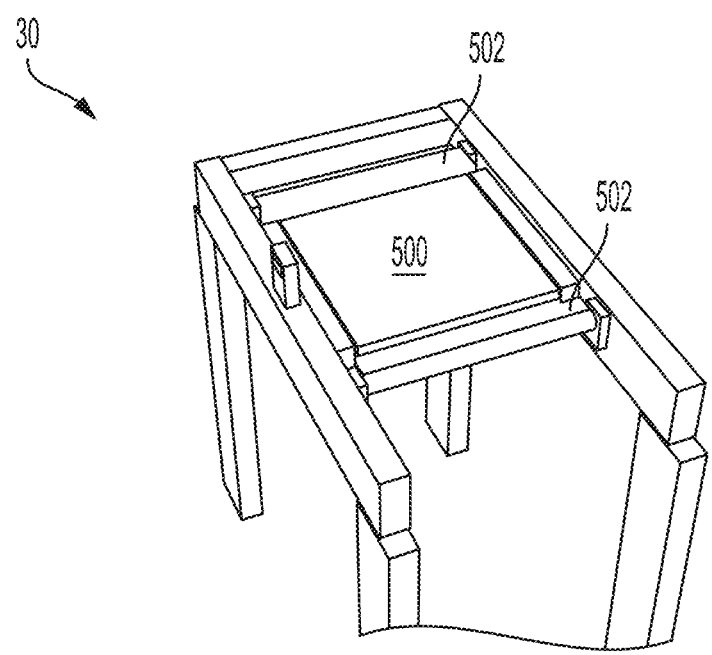

With reference to FIGS. 16A and 16B, the weighing system 30 may include a Legal-for-Trade scale 500 mounted just below a very thin weighing belt 502, and the belt 502 may be driven around rollers to move objects off of the scale 500 toward the lower processing area 14. The belt may be formed of a very thin and light polyester or polyamide fabrics, and should be arranged to impart no resistance to the weighing of objects on the scale by resting on the scale yet having virtually negligible weight (e.g., less than about 0.05 oz, or 0.005 oz).

Figure 17:
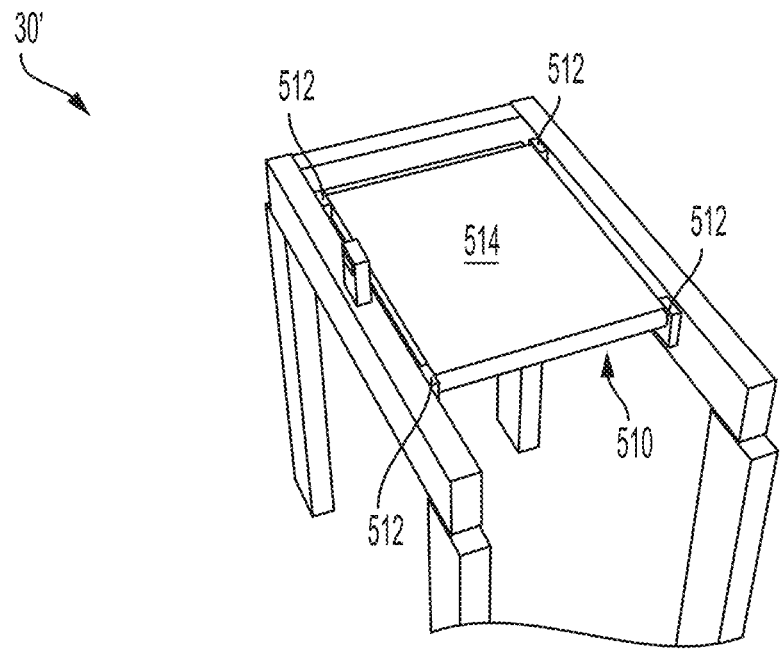
FIG. 17 shows an illustrative diagrammatic view of a weighing system for use with a buffering system in accordance with an aspect of the present invention wherein the weighing system includes a belted conveyor section mounted on force torque sensors or load cells.
Figure 18:
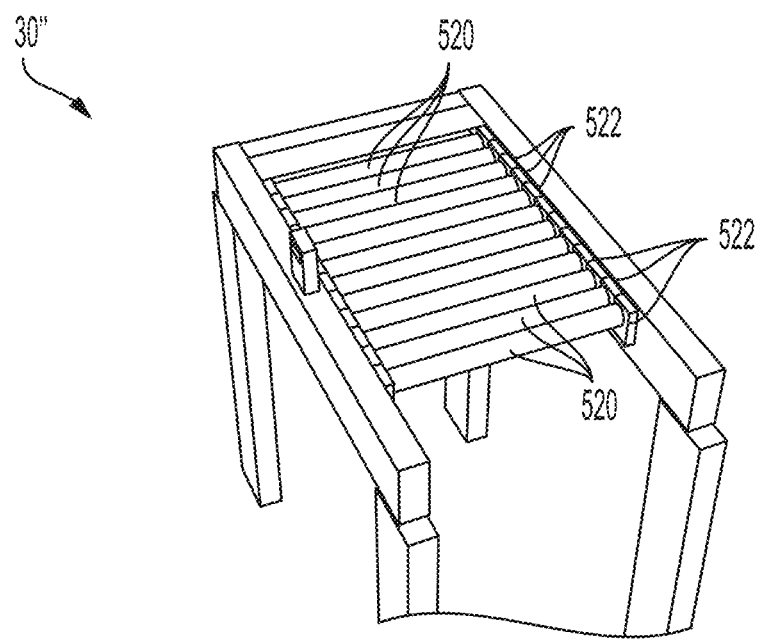
FIG. 18 shows an illustrative diagrammatic view of a weighing system for use with a buffering system in accordance with an aspect of the present invention wherein the weighing system includes roller conveyor section with each roller mounted on force torque sensors or load cells.
Figure 19A:
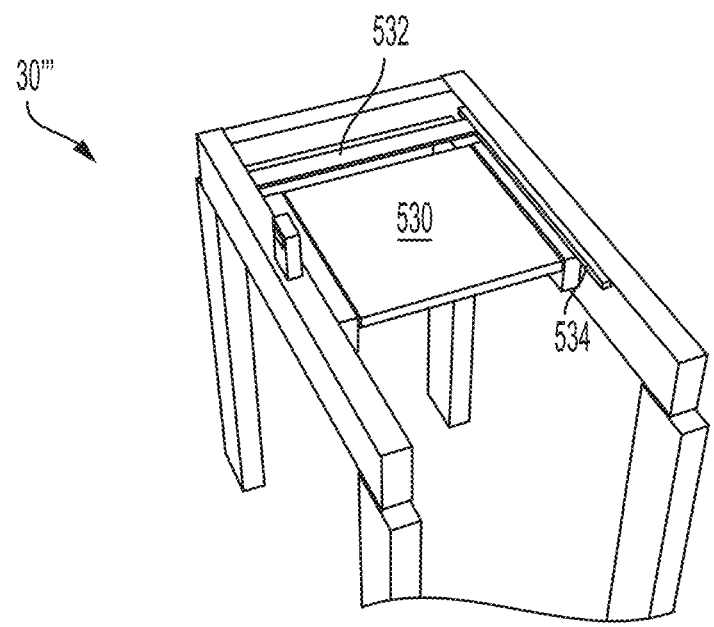
FIGS. 19A and 19B show illustrative diagrammatic views of a weighing system for use with a buffering system in accordance with an aspect of the present invention wherein the weighing system includes a reciprocating bar that facilitates moving objects off of the weighing scale, showing the reciprocating bar in a retracted position (FIG. 19A) and in an active position (FIG. 19B)
Figure 19B:
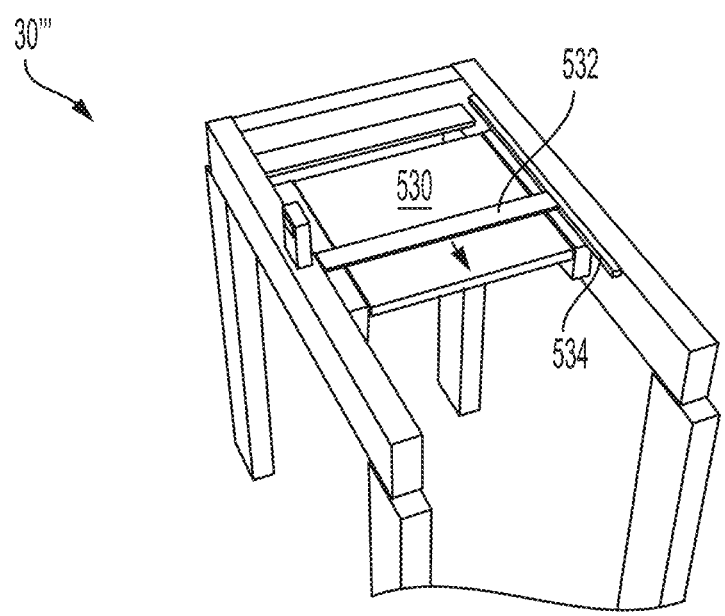

In accordance with another aspect, the weighing system may include a conveyor belt on rollers, wherein the rollers are mounted on force torque sensors or load cells. For example, FIG. 17 shows a weighing system 30' that includes rollers 510 mounted on force torque sensors or load cells 512, wherein a conveyor belt 514 is driven around the rollers 510. The weighing system 30' with the force torque sensors or load cells may provide Legal-for-Trade measurements. In accordance with further aspects, FIG. 18 shows a weighing system 30" that includes rollers 520 mounted on force torque sensors or load cells 522, wherein the rollers 520 move the object. The weighing system 30" with the force torque sensors or load cells may provide Legal-for-Trade measurements. In accordance with yet further aspects, a weighing system 30''' may include a Legal-for-Trade weighing scale 530, as well as a reciprocating bar 532 that moves along tracks 534 to clear objects off of the scale 530 and toward the lower processing area as shown in FIGS. 19A and 19B. Any of the weighing systems 30, 30', 30", 30''' may be used in systems described herein. Further, the systems described herein may be used with automated object processing system not including weighing systems but where more gentle placement of objects at a receiving area is desired.

Figure 20A:
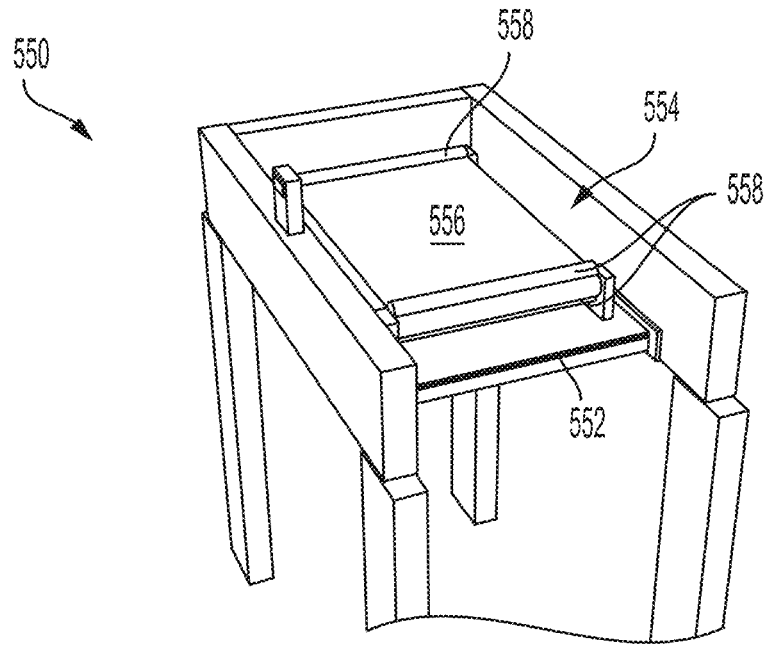
FIGS. 20A and 20B show illustrative diagrammatic views of a weighing system for use with a buffering system in accordance with an aspect of the present invention wherein the weighing system includes a cleated belt conveyor with large cleated sections for receiving objects, showing the cleated belt conveyor in a first position for receiving an object (FIG. 20A) and a second position wherein the belt with cleats has moved forward to discharge an object (FIG. 20B)
Figure 20B:
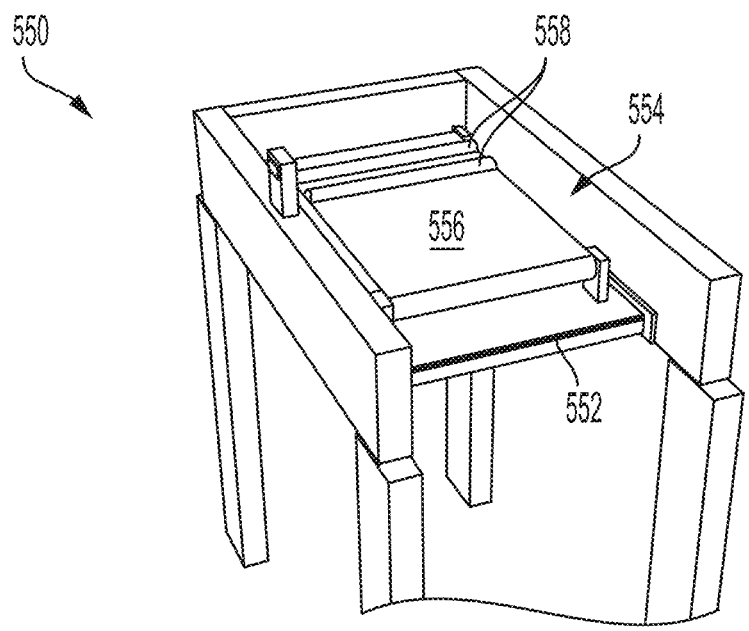
Figure 21:
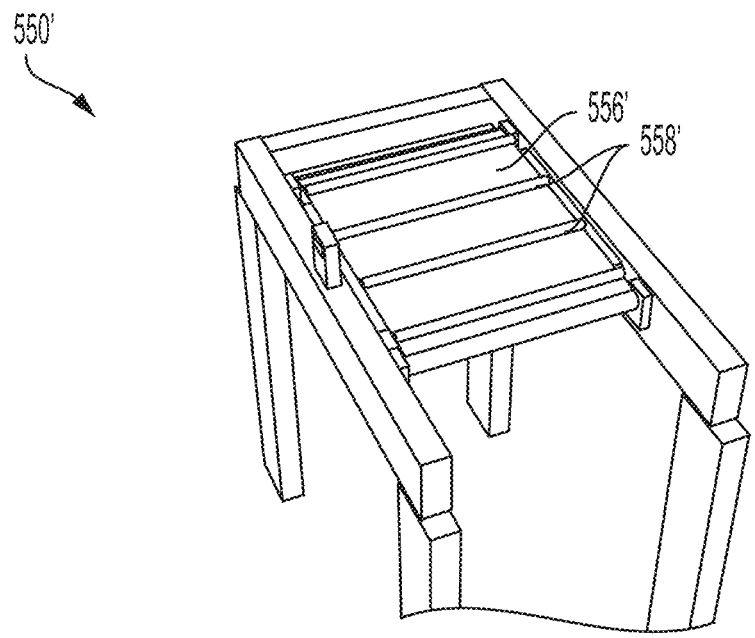
FIG. 21 shows an illustrative diagrammatic view of a weighting system for use with a buffering system in accordance with an aspect of the present invention wherein the weighing system includes a cleated belt conveyor with mid-sized cleated sections for receiving smaller objects.
Figure 22:
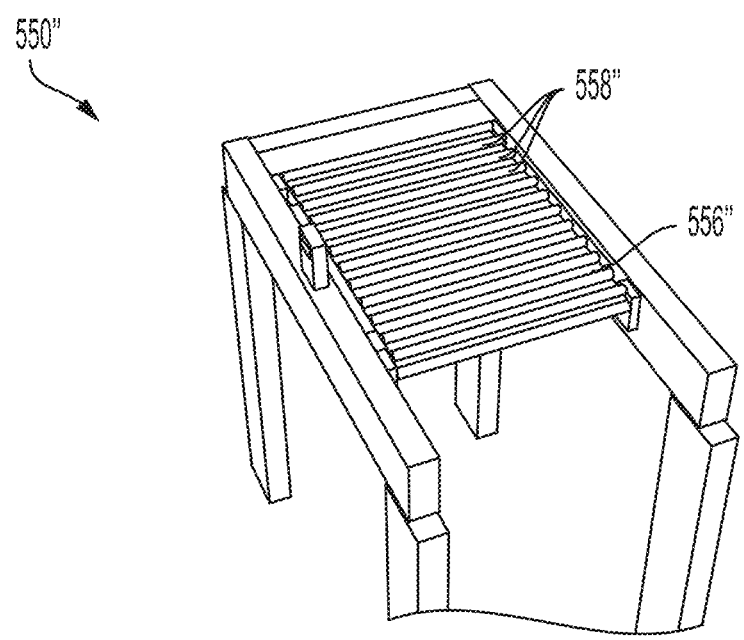
FIG. 22 shows an illustrative diagrammatic view of a weighting system for use with a buffering system in accordance with an aspect of the present invention wherein the weighing system includes a cleated belt conveyor with tightly spaced cleated sections for receiving objects thereon.

In accordance with certain aspects, the belt 502 may be a cleated conveyor that is mounted on the scale itself (with its weight zeroed out). For example, FIGS. 20A and 20B show a weighing system 550 that includes a Legal-for-Trade scale 552, and a conveyor section 554 mounted on the scale. The conveyor section includes a conveyor belt 556 with cleats 558 (e.g., four that define top and bottom areas, a top area being shown in FIG. 20A). FIG. 21 shows a weighting system for use with a buffering system in accordance with an aspect of the present invention wherein the weighing system 550' includes a cleated belt conveyor 556' with cleats 558' providing mid-sized cleated sections for receiving smaller objects. In accordance with further aspects, one side of the belted conveyor may include a large open area, while the opposite side of the belt includes plural smaller areas. The system may rotate the belt to have either side facing the object to be received as deemed most appropriate for the object. FIG. 22 shows a weighting system for use with a buffering system in accordance with an aspect of the present invention wherein the weighing system 550" includes a cleated belt conveyor 56" with tightly spaced cleats 558" providing a cleated section of the belt (or the entire belt) for receiving objects on the cleats. The cleats 558, 558', 558" facilitate handling of cylindrical or round objects, for example, by providing that such object settle between adjacent cleats during processing.

Figure 23A:
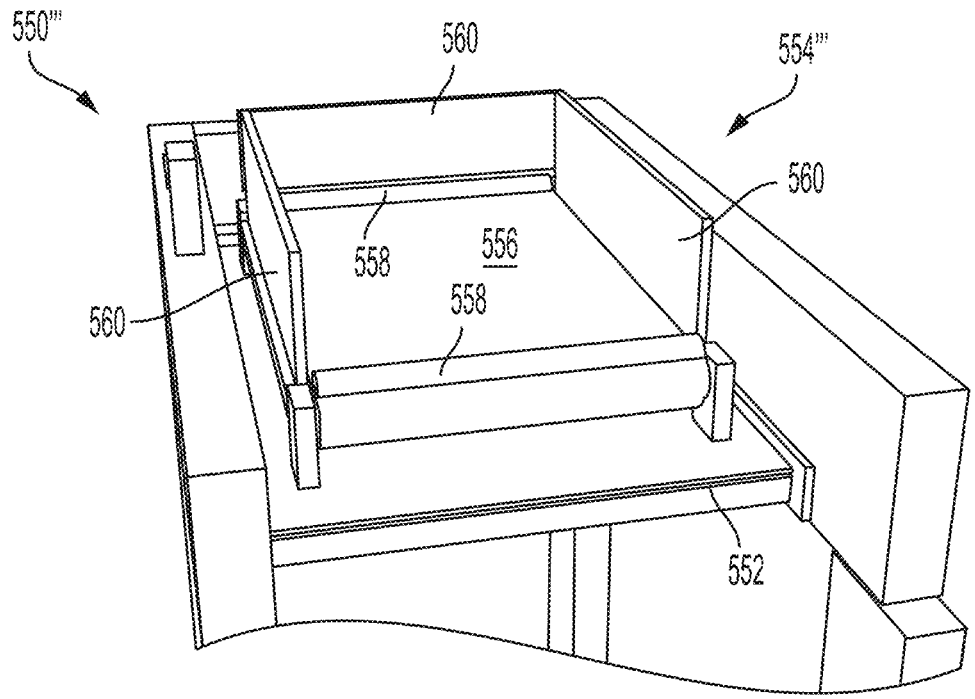
FIGS. 23A and 23B show illustrative diagrammatic views of a weighing system for use with a buffering system in accordance with an aspect of the present invention wherein the weighing system includes a cleated belt conveyor with large cleated sections as well as guide walls for receiving objects, showing the cleated belt conveyor in a first position for receiving an object (FIG. 23A) and a second position wherein the belt with cleats has moved forward to discharge an object (FIG. 23B)
Figure 23B:
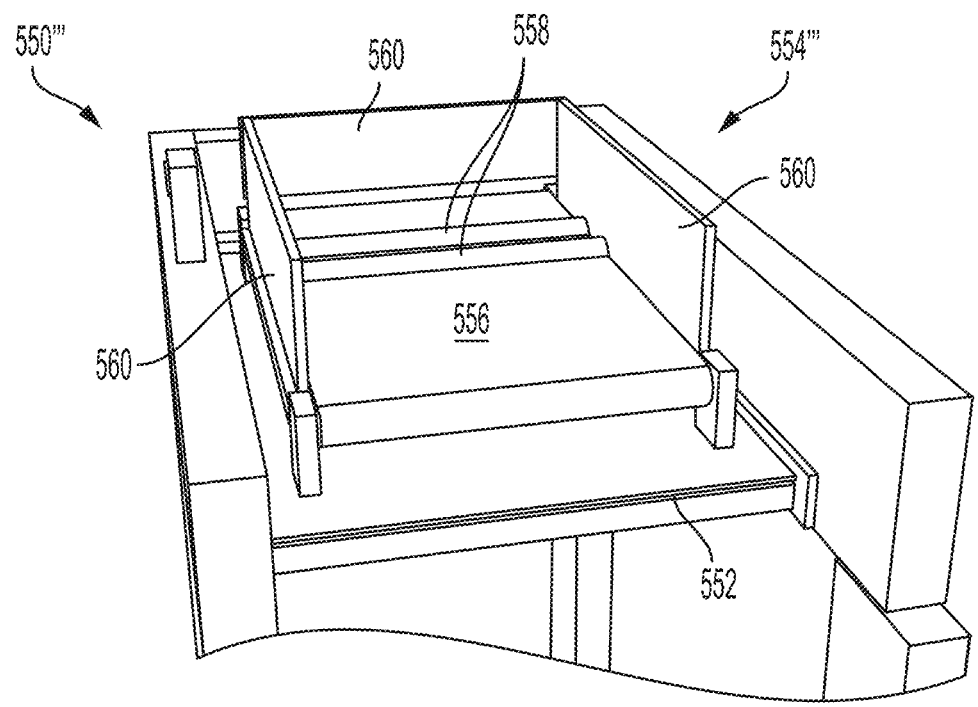

In accordance with further aspects, and with reference to FIGS. 23A and 23B, the system 550''' may include the Legal-for-Trade scale 552 and a cleated conveyor 554''' mounted thereon (including the belt 556 and cleats 558), as well as walls 560. In each of these systems 550, 550', 550", 550''', the cleated conveyor (and optional walls) are zeroed out on the scale 552, providing the Legal-for-Trade weight on any object on the belt 556. The use of such a cleated belt conveyor on a scale may be used as the weighing system of any of the buffering systems disclosed herein.

Figure 24A:
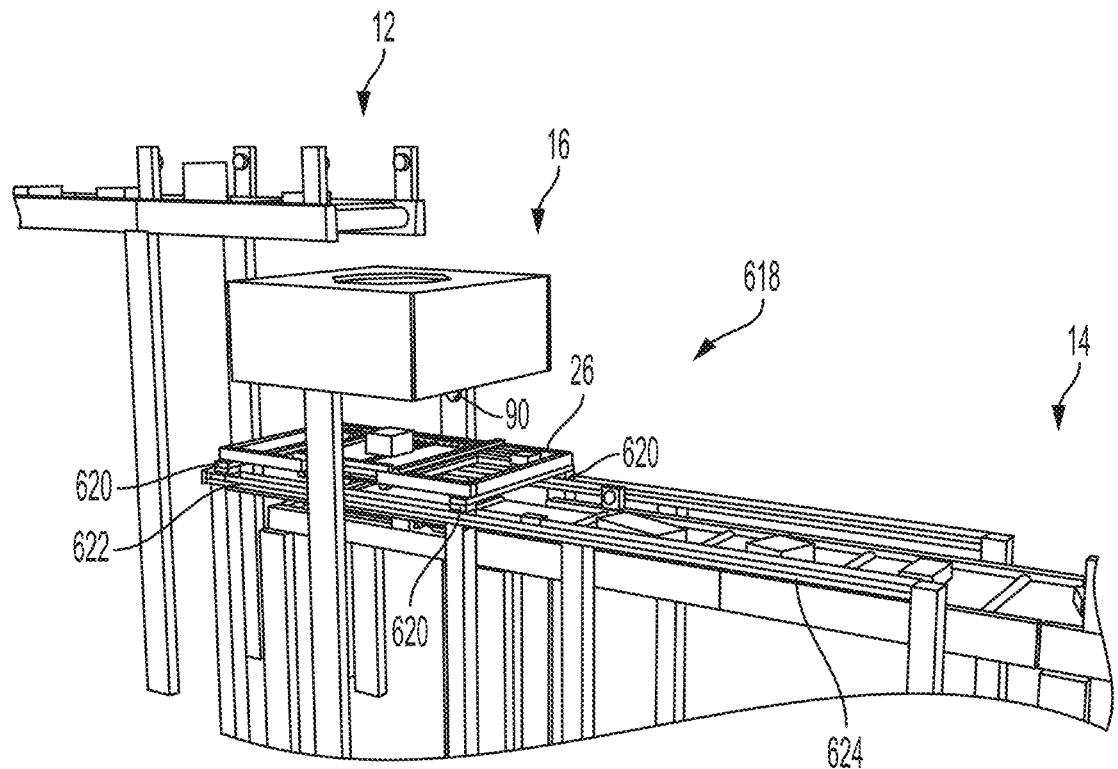
FIGS. 24A and 24B show illustrative diagrammatic views of a buffering system in accordance with a further aspect of the present invention wherein the buffering system is mounted on a rail system, showing the buffering system in a position to receive an object (FIG. 24A) and showing the retractable belt doors of the buffering system having been moved along the rails to an extended position (FIG. 24B).
Figure 24B:
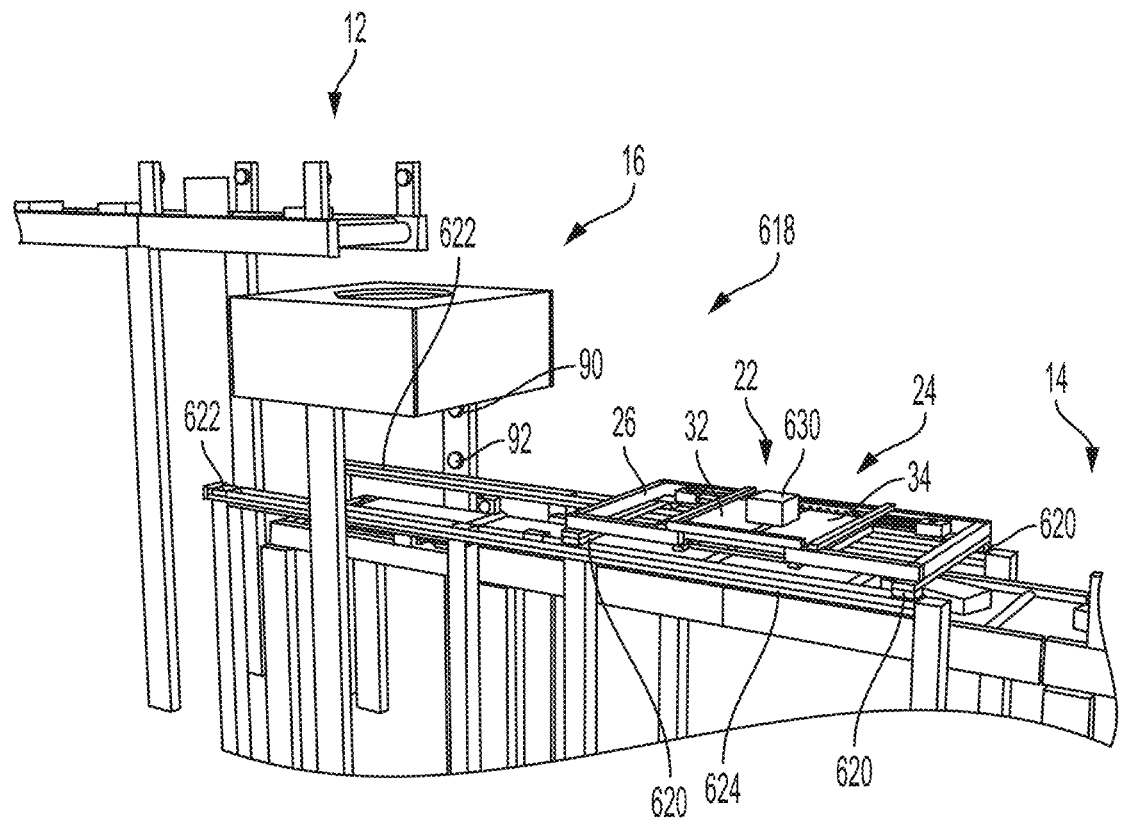

In accordance with yet further aspects, a buffering system may include a system for bypassing a receiving area (such as a weighing system). For example, FIG. 24A shows a buffering system 618 below the drop perception system 16 that receives objects from the upper processing area and provides them the lower processing area 14 as discussed above. The buffering system 618 includes a pair of retractable belt doors 22, 24 provided by belts 32, 34 on a frame 26 as discussed above in connection with the previously discussed embodiments (as also shown in FIG. 24B). The frame 26 however, is mounted on force torque sensors or load cells 620, which as in turn mounted on a rail system 622. If the force torque sensors or load cells 620 provide output indicative that an object (e.g., 630) is too heavy for a weighing system under the drop perception unit 16, then the frame 26 (and the reciprocating belt doors 22, 24) move along the rails 622 by a rail system linear actuator 624 to a position where the object 630 is not above the weighing system 30. The object 630 is then dropped onto a downstream location at the lower processing area 14. Using such a system, the weighing system 30 (or other receiving area) may be protected from receiving a very heavy object.

Again, operation of each of the above disclosed systems may be governed by one or more computer processing systems 100 that perform the operations discussed above in communication with other conveyor systems in the object processing system, a drop perception system, sensors including light beam detectors, force torque sensors or load cells, and the buffering system including collapsible/extendable support control systems, and all rotational motors and linear motors including retractable belt door linear actuators and rail system linear actuators.

Those skilled in the art will appreciate that numerous modifications and variations may be made to the above disclosed embodiments without departing from the spirit and scope of the present invention.

What is claimed is:

1. A buffering system for use between an upper processing area and a lower processing area, said buffering system comprising a belt and at least one roller around at least a portion of which the belt extends, wherein a first end of the belt is fixed to a frame at a first anchor location and a second end of the belt is fixed to the frame at a second anchor location, and an actuation system for moving the at least one roller with respect to the first anchor location and the second anchor location to cause the belt to move such that a portion of the buffering system becomes open thereby providing a retractable belt door.

2. The buffering system as claimed in claim 1, wherein the buffering system includes a plurality of belts extending around a plurality of rollers to thereby provide a plurality of retractable belt doors.

3. The buffering system as claimed in claim 1, wherein the at least one roller includes a first roller and a second roller around which the belt extends, the first roller and the second roller being attached to a common panel.

4. The buffering system as claimed in claim 3, wherein the second roller is mounted to the common panel on a pivoting mounting bracket.

5. The buffering system as claimed in claim 1, wherein the actuation system includes at least one linear actuator to move the at least one roller.

6. The buffering system as claimed in claim 1, wherein the first anchor location includes a biasing system for maintaining tension in the belt.

7. The buffering system as claimed in claim 3, wherein the common panel includes cushioning material to absorb impact of an object.

8. The buffering system as claimed in claim 1, wherein the belt includes at least one cleat.

9. The buffering system as claimed in claim 3, wherein the common panel is mounted for reciprocal movement within the frame.

10. The buffering system as claimed in claim 9, wherein the buffering system further comprises a sub-frame suspended below and connected to the frame by suspension mechanisms to absorb impact of an object.

11. The buffering system as claimed in claim 1, wherein the buffering system includes a detection system for providing detection data representative of whether an object has been dropped from the belt.

12. An object processing system including the buffering system of claim 1, wherein the object processing system includes a receiving station below the buffering system.

13. The object processing system as claimed in claim 12, wherein the receiving station includes a weighing system.

14. The object processing system as claimed in claim 13, wherein the weighing system includes a conveyor.

15. A buffering system for use between an upper processing area and a lower processing area, said buffering system comprising:
a frame;
a retractable belt door moveably coupled within the frame, the retractable belt door including at least one roller mounted to a common panel for reciprocal movement with respect to the frame, and a belt extending around the at least one roller, wherein a first end of the belt is fixed to the frame at a first anchor location and a second end of the belt is fixed to the frame at a second anchor location; and
an actuation system for moving the common panel with respect to the frame to cause the belt to move such that a portion of the frame becomes open.

16. The buffering system as claimed in claim 15, wherein the retractable belt door is one of a plurality of retractable belt doors moveably coupled within the frame.

17. The buffering system as claimed in claim 15, wherein the at least one roller mounted to the common panel includes a first roller and a second roller around which the belt extends, wherein the first roller is attached to a first end of the common panel and the second roller is attached to a second end of the common panel.

18. The buffering system as claimed in claim 17, wherein the second roller is mounted to the common panel on a pivoting mounting bracket.

19. The buffering system as claimed in claim 17, wherein the common panel includes cushioning material to absorb impact of an object.

20. The buffering system as claimed in claim 15, wherein the actuation system includes at least one linear actuator to move the at least one roller.

21. The buffering system as claimed in claim 15, wherein the first anchor location includes a biasing system for maintaining tension in the belt.

22. The buffering system as claimed in claim 15, wherein the belt includes at least one cleat.

23. The buffering system as claimed in claim 15, wherein the buffering system further comprises a sub-frame suspended below and connected to the frame by suspension mechanisms to absorb impact of an object.

24. The buffering system as claimed in claim 15, wherein the buffering system includes a detection system for providing detection data representative of whether an object has been dropped from the belt.

25. An object processing system including the buffering system of claim 15, wherein the object processing system includes a receiving station below the buffering system.

26. The object processing system as claimed in claim 25, wherein the receiving station includes a weighing system.

27. The object processing system as claimed in claim 26, wherein the weighing system includes a conveyor.

28. A method of buffering an object falling from an upper processing area to a lower processing area, said method comprising:
   providing at least one retractable belt door mounted for reciprocal movement with respect to a frame onto which the object may fall, the retractable belt door including a belt, wherein a first end of the belt is fixed to the frame at a first anchor location and a second end of the belt is fixed to the frame at a second anchor location;
   retracting the belt to peel away from the object; and
   permitting the object to fall through the retractable belt door.

29. The method of claim 28, wherein the retractable belt door includes at least one roller, and retracting the belt includes retracting the at least one roller.

30. The method of claim 28, wherein the method further includes providing a second retractable belt door onto which the object may also fall, the second retractable belt door including a second belt.

31. The method of claim 29, wherein the at least one roller includes a first roller and a second roller around which the belt extends, the first roller and the second roller being attached to a common panel.

32. The method of claim 31, wherein the second roller is mounted to the common panel on a pivoting mounting bracket.

33. The method of claim 29, wherein retracting the belt includes engaging at least one linear actuator to move the at least one roller.

34. The method of claim 28, wherein the method further includes maintaining tension in the belt with a biasing system.

35. The method of claim 31, wherein the common panel includes cushioning material to absorb impact of an object.

36. The method of claim 31, wherein the first roller and the second roller are mounted for reciprocal movement within a frame.

37. The method of claim 36, wherein a sub-frame is suspended below and connected to the frame by suspension mechanisms to absorb impact of the object.

38. The method of claim 28, wherein the method further includes dropping the object from the retractable belt door to a receiving station below the retractable belt door.

39. The method of claim 38, wherein the receiving station includes a weighing system.

40. The method of claim 39, wherein the weighing system includes a conveyor.

41. A buffering system for use between an upper processing area and a lower processing area, said buffering system comprising a belt and at least one roller around at least a portion of which the belt extends, wherein the belt is anchored at a first anchor location to a frame, and an actuation system for moving the at least one roller with respect to the first anchor location to cause the belt to move such that a portion of the buffering system becomes open thereby providing a retractable belt door, wherein the buffering system further comprises a sub-frame suspended below and connected to the frame by suspension mechanisms to absorb impact of an object.

42. The buffering system as claimed in claim 41, wherein the buffering system includes a plurality of belts extending around a plurality of rollers to thereby provide a plurality of retractable belt doors.

43. The buffering system as claimed in claim 41, wherein a first end of the belt is anchored to the frame at the first anchor location, and a second end of the belt is anchored to the frame at a second anchor location.

44. The buffering system as claimed in claim 41, wherein the at least one roller includes a first roller and a second roller around which the belt extends, the first roller and the second roller being attached to a common panel.

45. The buffering system as claimed in claim 44, wherein the second roller is mounted to the common panel on a pivoting mounting bracket.

46. The buffering system as claimed in claim 41, wherein the actuation system includes at least one linear actuator to move the at least one roller.

47. The buffering system as claimed in claim 41, wherein the first anchor location includes a biasing system for maintaining tension in the belt.

48. The buffering system as claimed in claim 44, wherein the common panel includes cushioning material to absorb impact of an object.

49. The buffering system as claimed in claim 41, wherein the belt includes at least one cleat.

50. The buffering system as claimed in claim 44, wherein the common panel is mounted for reciprocal movement within the frame.

51. The buffering system as claimed in claim 41, wherein the buffering system includes a detection system for providing detection data representative of whether an object has been dropped from the belt.

52. An object processing system including the buffering system of claim 41, wherein the object processing system includes a receiving station below the buffering system.

53. The object processing system as claimed in claim 52, wherein the receiving station includes a weighing system.

54. The object processing system as claimed in claim 53, wherein the weighing system includes a conveyor.

55. A buffering system for use between an upper processing area and a lower processing area, said buffering system comprising at least one roller mounted for reciprocal movement with respect to a frame, and a belt extending around the at least one roller, and an actuation system for moving the at least one roller with respect to frame to cause the belt to move such that a portion of the buffering system becomes open thereby providing a retractable belt door, wherein the buffering system further comprises a sub-frame suspended below and connected to the frame by suspension mechanisms to absorb impact of an object.

56. The buffering system as claimed in claim 55, wherein the buffering system includes a plurality of belts extending around a plurality of rollers to thereby provide a plurality of retractable belt doors.

57. The buffering system as claimed in claim 55, wherein a first end of the belt is anchored to the frame at a first anchor location, and a second end of the belt is anchored to the frame at a second anchor location.

58. The buffering system as claimed in claim 55, wherein the at least one roller includes a first roller and a second roller around which the belt extends, the first roller and the second roller being attached to a common panel.

59. The buffering system as claimed in claim 58, wherein the second roller is mounted to the common panel on a pivoting mounting bracket.

60. The buffering system as claimed in claim 58, wherein the common panel includes cushioning material to absorb impact of an object.

61. The buffering system as claimed in claim 55, wherein the actuation system includes at least one linear actuator to move the at least one roller.

62. The buffering system as claimed in claim 57, wherein the first anchor location includes a biasing system for maintaining tension in the belt.

63. The buffering system as claimed in claim 55, wherein the belt includes at least one cleat.

64. The buffering system as claimed in claim 58, wherein the common panel is mounted for reciprocal movement within the frame.

65. The buffering system as claimed in claim 55, wherein the buffering system includes a detection system for providing detection data representative of whether an object has been dropped from the belt.

66. An object processing system including the buffering system of claim 55, wherein the object processing system includes a receiving station below the buffering system.

67. The object processing system as claimed in claim 66, wherein the receiving station includes a weighing system.

68. The object processing system as claimed in claim 67, wherein the weighing system includes a conveyor.

69. A method of buffering an object falling from an upper processing area to a lower processing area, said method comprising:
providing at least one retractable belt door mounted for reciprocal movement with respect to a frame onto which the object may fall, the retractable belt door including a belt;
retracting the belt by moving one end only of the belt to peel away from the object; and
permitting the object to fall through the retractable belt door,
wherein a sub-frame is suspended below and connected to the frame by suspension mechanisms to absorb impact of the object.

70. The method of claim 69, wherein the retractable belt door includes at least one roller, and retracting the belt includes retracting the at least one roller.

71. The method of claim 69, wherein the method further includes providing a second retractable belt door onto which the object may also fall, the second retractable belt door including a second belt.

72. The method of claim 69, wherein a first end of the belt is anchored at a first anchor location, and a second end of the belt is anchored at a second anchor location.

73. The method of claim 70, wherein the at least one roller includes a first roller and a second roller around which the belt extends, the first roller and the second roller being provided attached to a common panel.

74. The method of claim 73, wherein the second roller is mounted to the common panel on a pivoting mounting bracket.

75. The method of claim 70, wherein retracting the belt includes engaging at least one linear actuator to move the at least one roller.

76. The method of claim 69, wherein the method further includes maintaining tension in the belt with a biasing system.

77. The method of claim 73, wherein the common panel includes cushioning material to absorb impact of an object.

78. The method of claim 70, wherein the at least one roller is mounted for reciprocal movement within the frame.

79. The method of claim 69, wherein permitting the object to fall through the retractable belt door includes dropping the object from the retractable belt door to a receiving station below the retractable belt door.

80. The method of claim 79, wherein the receiving station includes a weighing system.

81. The method of claim 80, wherein the weighing system includes a conveyor.

* * * * *